United States Patent [19]
Drost et al.

[11] Patent Number: 5,575,590
[45] Date of Patent: Nov. 19, 1996

[54] INSTALLATION FOR LAYING A PIPELINE ON A FLOOR LOCATED UNDER WATER, BEARING MEANS AND TERMINAL

[75] Inventors: Johannes J. C. I. Drost, Vlaardingen; Erik J. Rooduijn, Bergschenhoek; Albert Ploeg, Benthuizen, all of Netherlands

[73] Assignee: Allseas Group S.A., Switzerland

[21] Appl. No.: 387,404

[22] Filed: Feb. 10, 1995

[30] Foreign Application Priority Data

Mar. 31, 1994 [NL] Netherlands ................... 9400517

[51] Int. Cl.$^6$ ............................................... F16L 1/235
[52] U.S. Cl. ........................................ 405/166; 405/171
[58] Field of Search ............................ 405/171, 166, 405/167, 168.1

[56] References Cited

U.S. PATENT DOCUMENTS

| | | | |
|---|---|---|---|
| 3,273,346 | 9/1966 | Delaruelle et al. | 405/171 X |
| 3,559,413 | 2/1971 | Silverman | 405/171 X |
| 3,566,609 | 3/1971 | Smith | 405/171 |
| 3,727,417 | 4/1973 | Shaw | 405/171 X |
| 3,756,034 | 9/1973 | Lochridge et al. | |
| 4,107,802 | 8/1978 | Patinet | 405/171 X |
| 4,121,529 | 10/1978 | Smith et al. | 405/171 |
| 4,127,006 | 11/1978 | Oosterkamp | 405/171 |
| 4,183,697 | 1/1980 | Lamy | 405/170 |
| 4,563,108 | 1/1986 | Hyers | 405/171 |

FOREIGN PATENT DOCUMENTS

| | | | |
|---|---|---|---|
| 2461181 | 3/1981 | France | 405/171 |
| 4006597 | 9/1991 | Germany | 405/171 |
| 7507179 | 1/1976 | Netherlands | 405/171 |
| 128713 | 7/1960 | U.S.S.R. | 405/171 |
| 947196 | 1/1964 | United Kingdom . | |

*Primary Examiner*—Hoang C. Dang
*Attorney, Agent, or Firm*—Mark Zovko

[57] ABSTRACT

The invention provides a method for laying a pipeline on a floor located under water, wherein a pipe string is lowered from the pipe-bedding installation to the floor, characterized in that the part of the pipe string situated between the water surface and the floor is at least partially supported by a bearing surface or trunk tubes which engage on the pipe string, wherein an axial displacement is realized between the bearing surface on the one hand and the pipe string on the other.

A heavy pipeline can hereby be laid on a deep sea-bed, for instance at a depth in the order of magnitude of 1–3 km, and/or the capacity of the draw benches on board the pipe-bedding installation can be reduced.

9 Claims, 34 Drawing Sheets

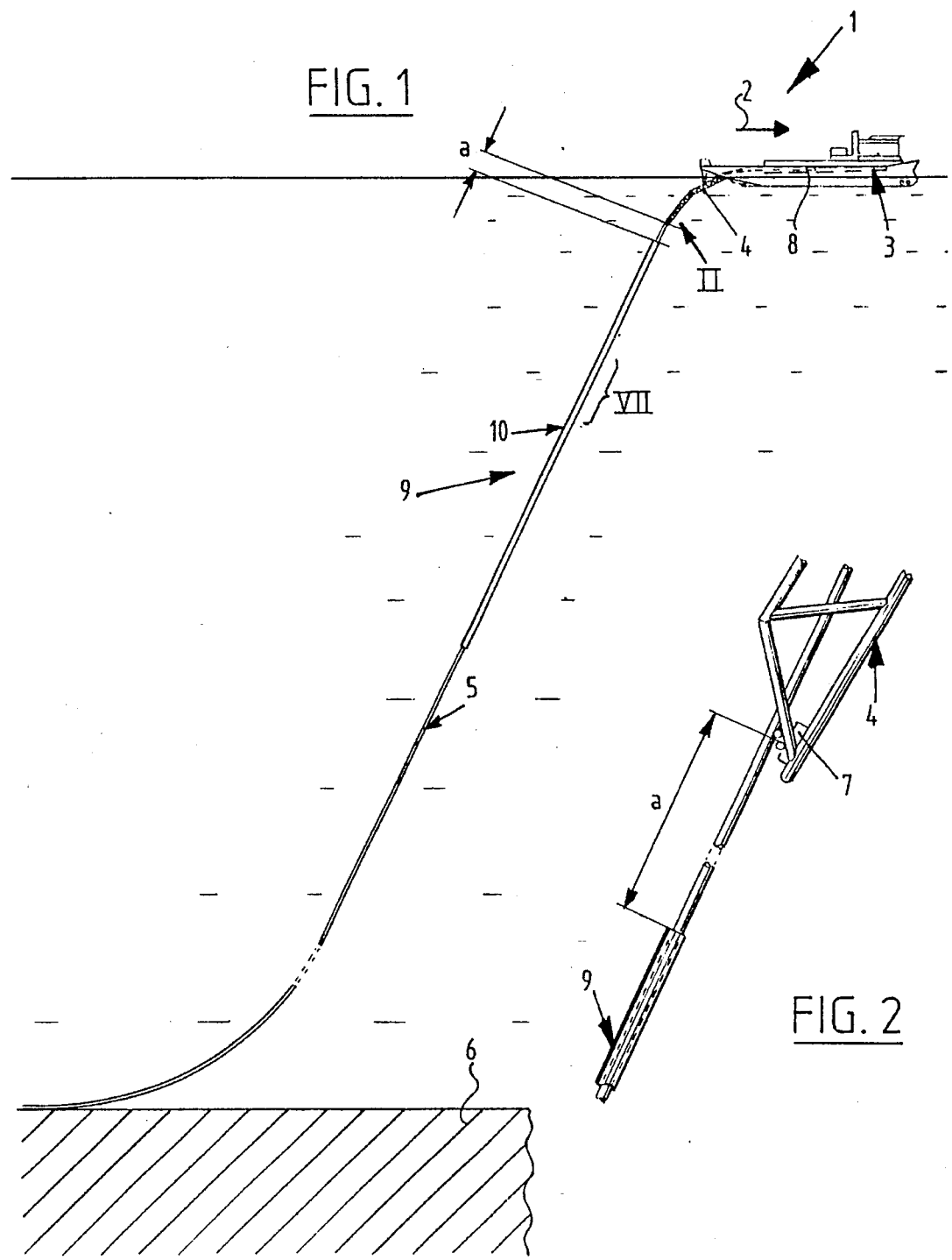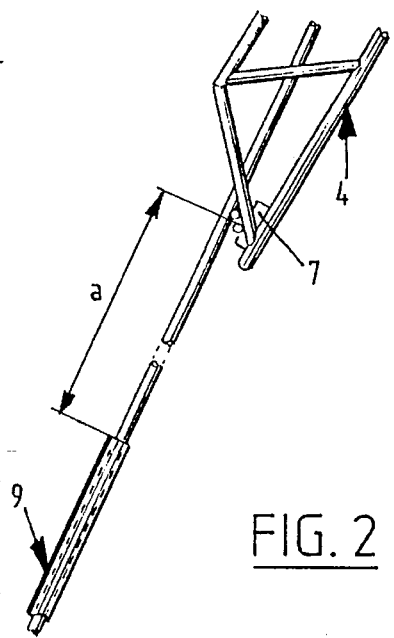

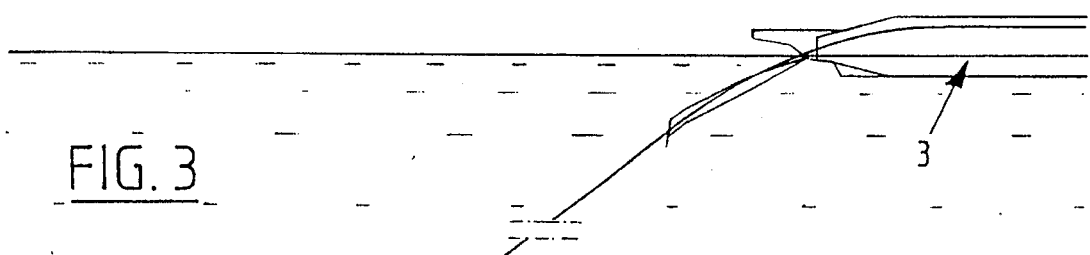
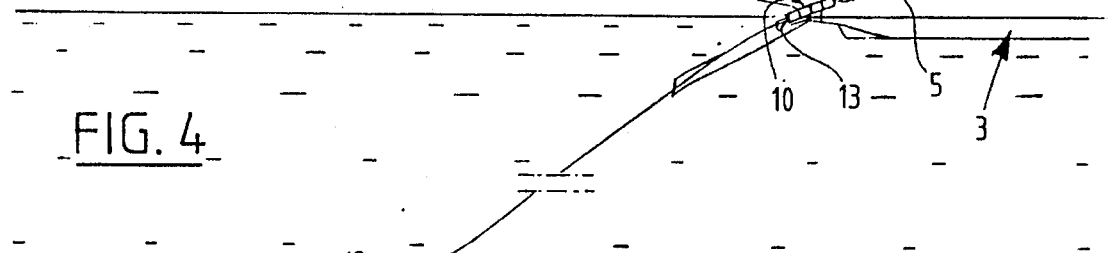
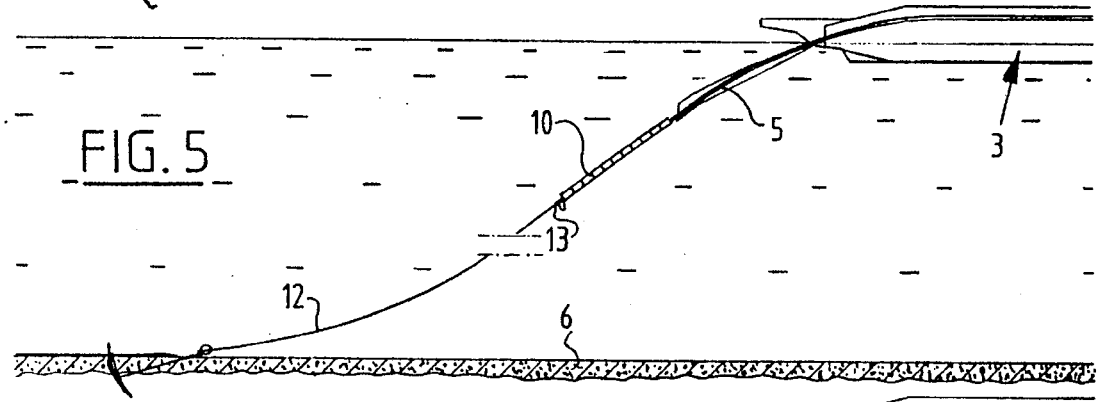
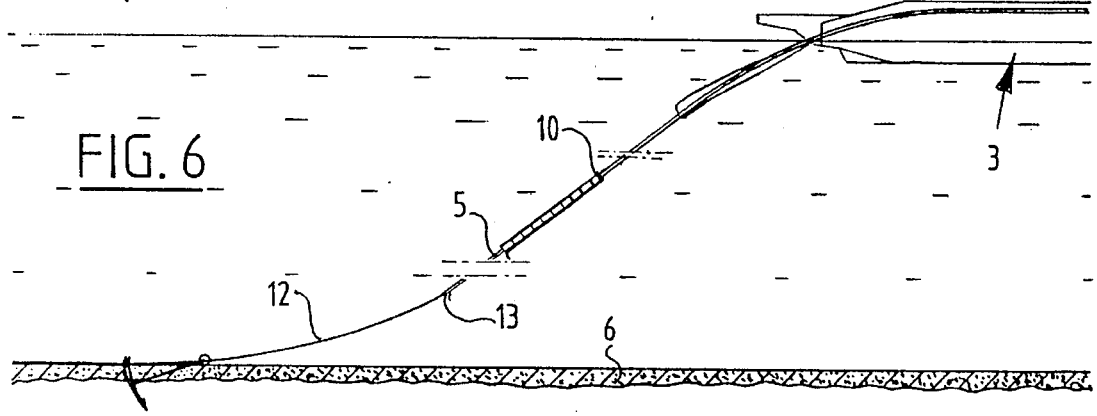

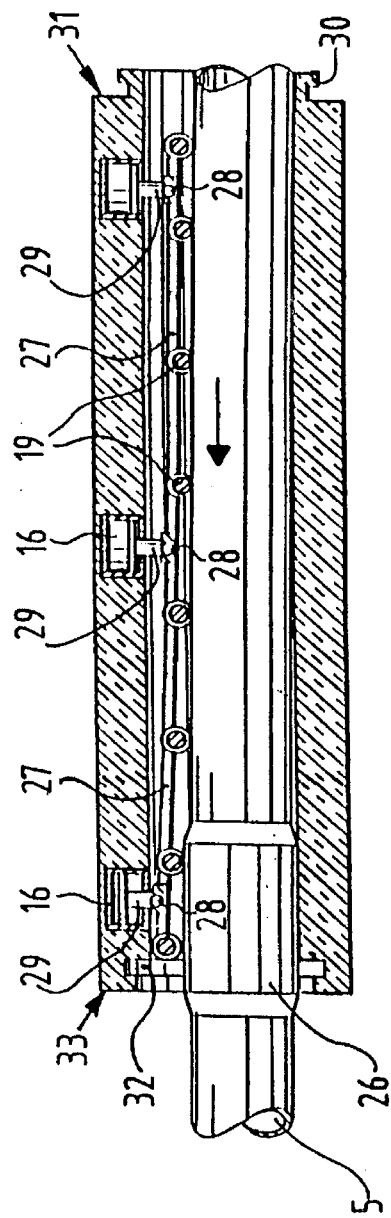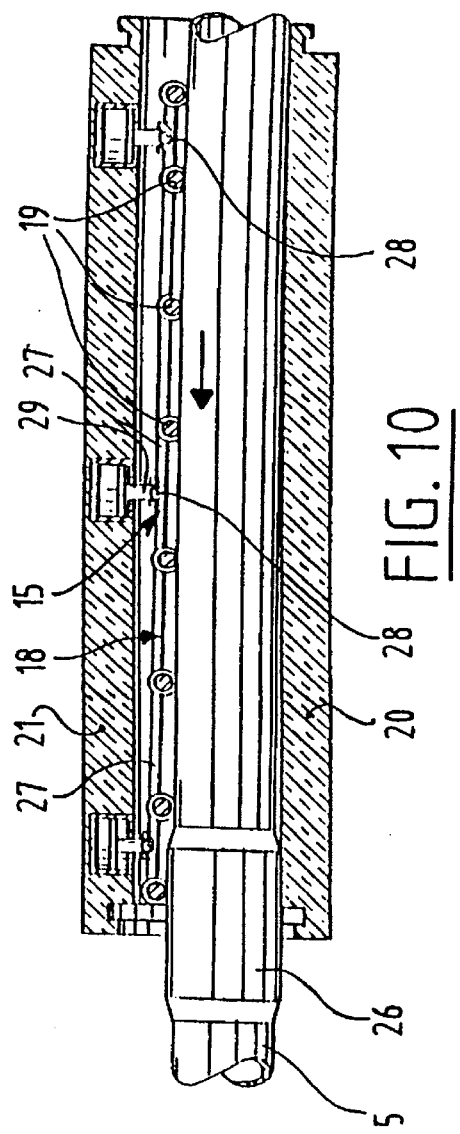

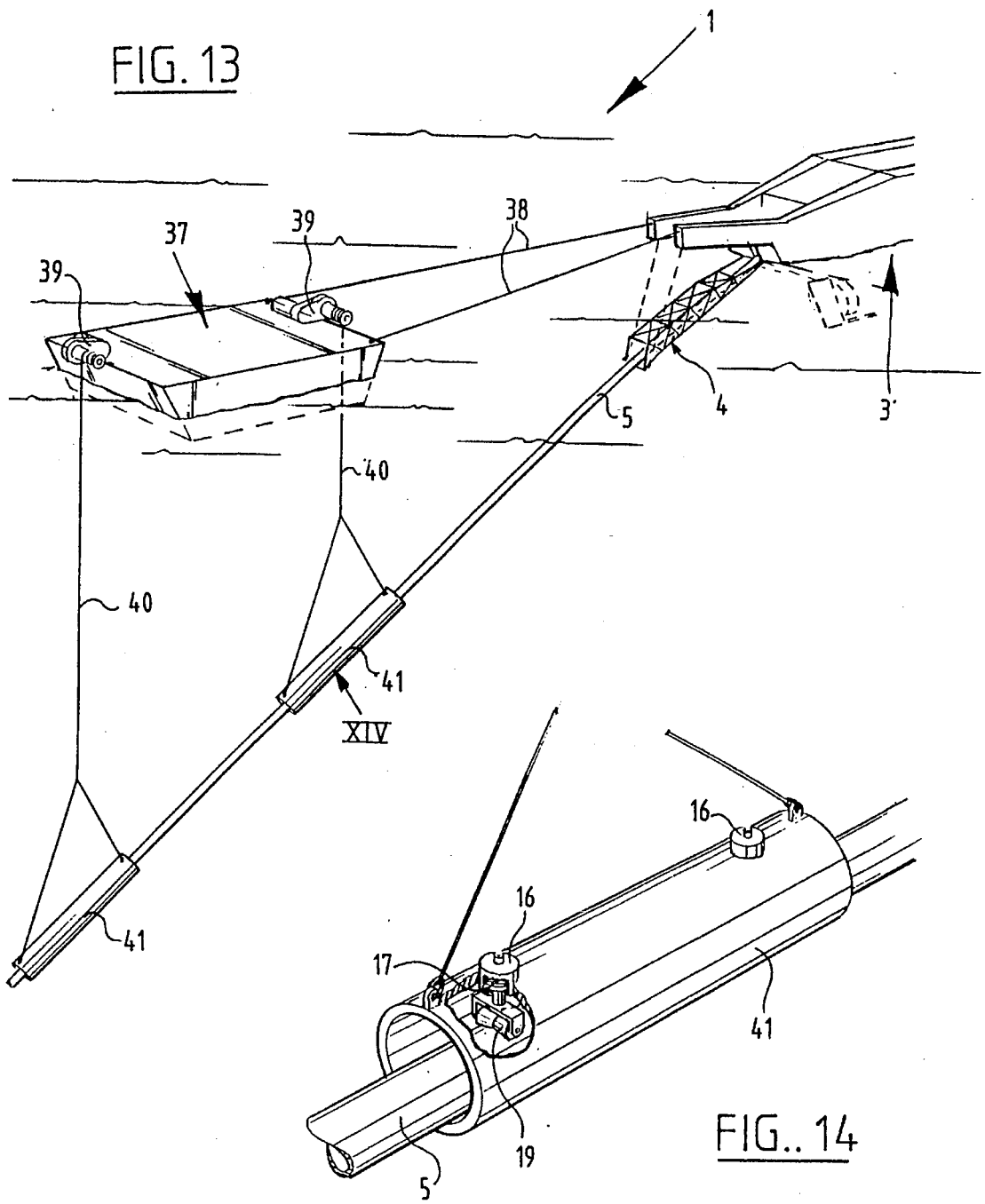

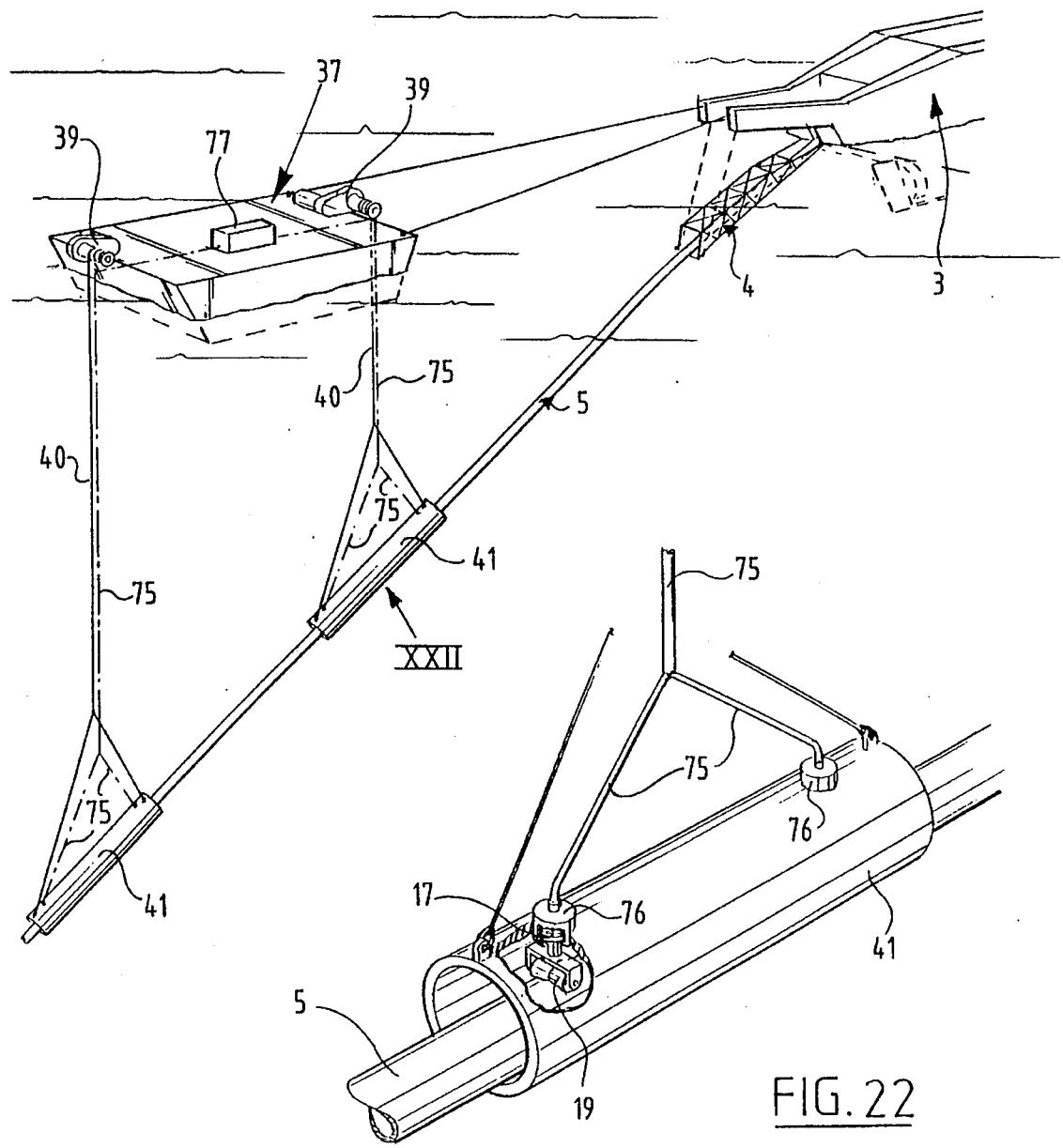

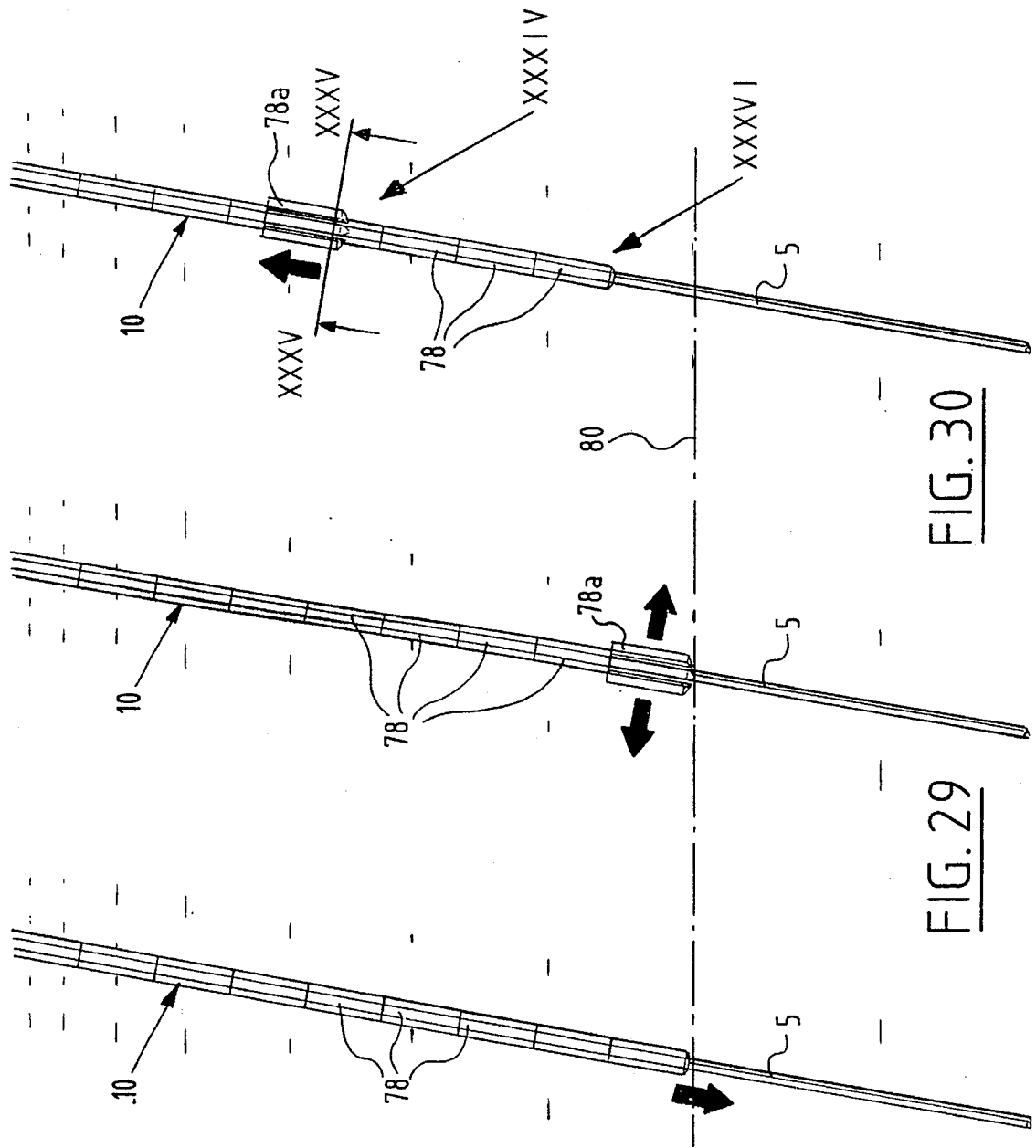

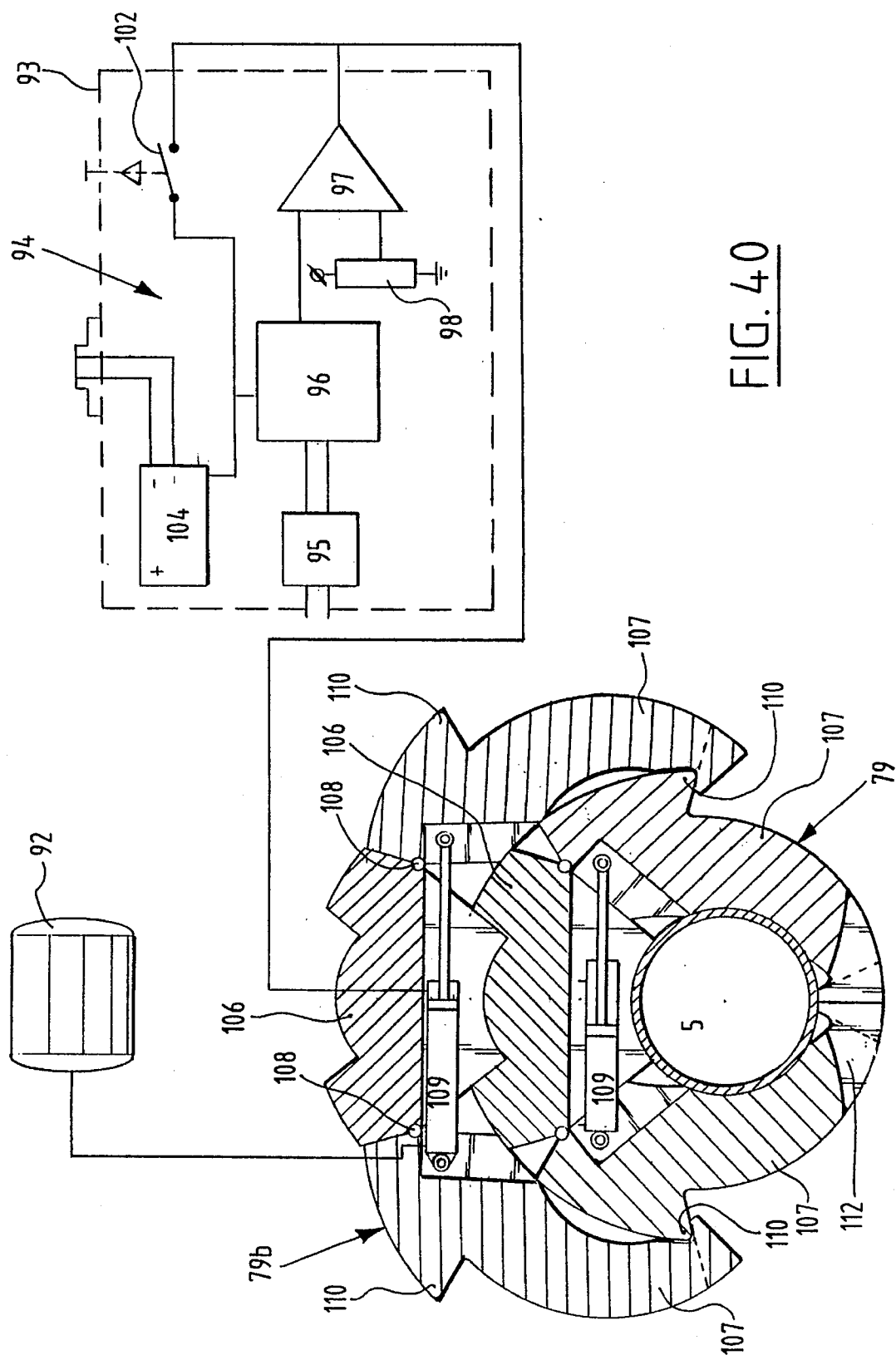

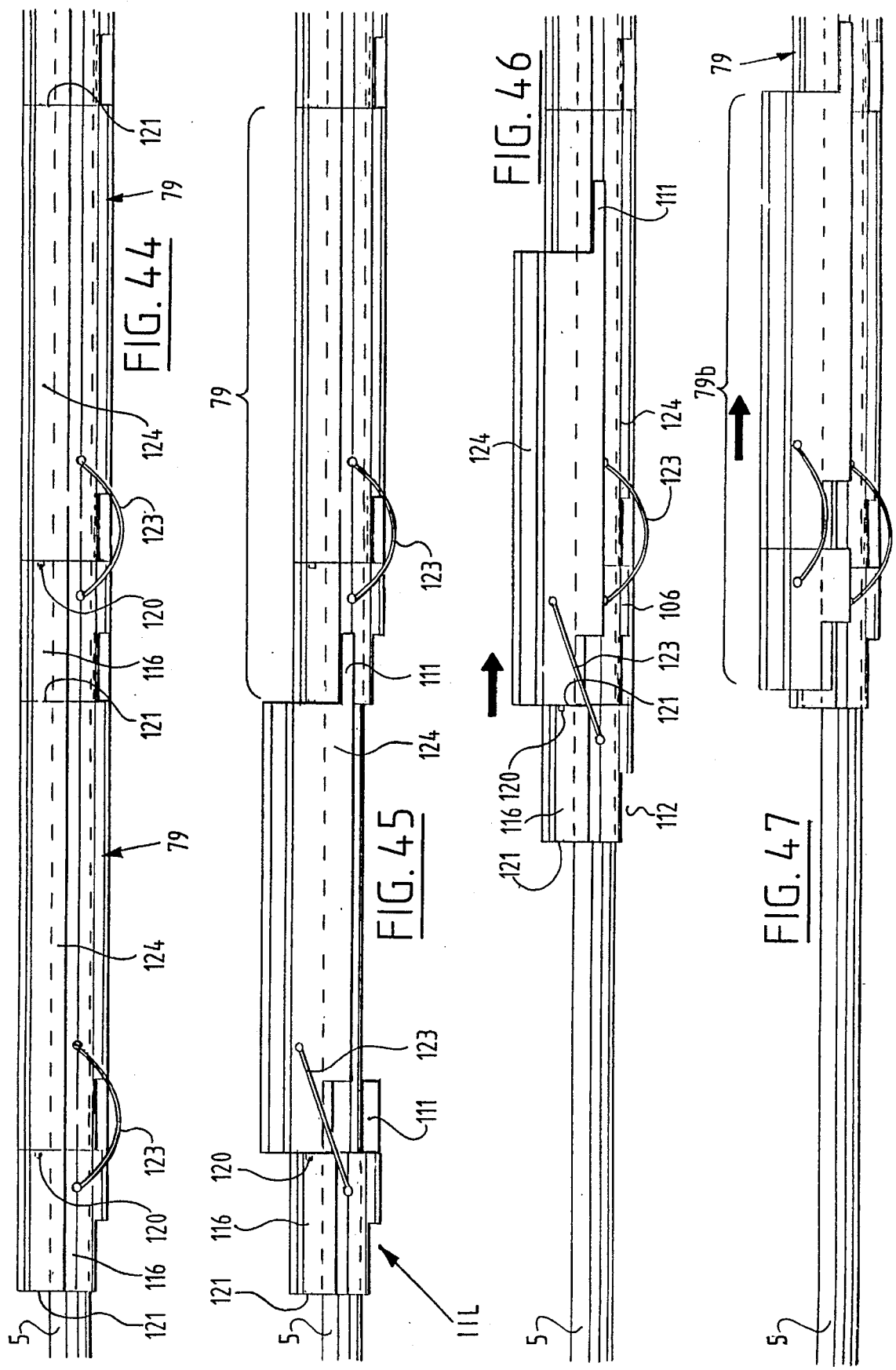

INSTALLATION FOR LAYING A PIPELINE ON A FLOOR LOCATED UNDER WATER, BEARING MEANS AND TERMINAL

The invention relates to a method for laying a pipeline on a floor located under water, wherein a pipe string is lowered from a pipe-bedding installation to the floor.

In the case piping is laid on a deep seabed, for instance at a depth in the order of magnitude of 1–3 km, the pipeline is heavy, on the one hand because it must withstand crushing under the influence of the high hydrostatic pressure, which requires a large wall thickness of the steel pipes, and on the other hand because the pipe string extending between the vessel and the deep seabed is long. The draw benches situated on the vessel must then produce a very large tractive force in order to hold the upper end of the pipe string. In the case the pipe string is lengthened in a lying position on board a vessel by constantly welding on pipes, a very large propulsion force is required of the vessel.

The invention has for its object to facilitate laying of pipelines at greater depth;
to reduce the tractive force required on board the vessel to hold the pipe string end;
to reduce the required propulsion effort of the vessel;
to reduce the capacity and/or length of the draw benches on board the pipe-bedding installation;
to reduce the constant tensile stress in the pipeline lying on the floor;
and/or to increase the possible pipeline bedding depth in order to enable laying of pipelines at locations where this was previously impossible. Due to application of the invention a terminal for transporting raw material such as oil or gas to another country is possible despite the gap of a very deep sea.

The method and installation according to the invention will be elucidated in the description following hereinbelow with reference to drawings on the basis of a number of non-limitative preferred embodiments. In the drawings in schematic form:

FIG. 1 shows a side view of the installation according to the invention during performing of the method according to the invention;

FIG. 2 shows on larger scale detail II of FIG. 1;

FIGS. 3–6 show schematic views of successive steps in performing the method according to the invention;

Figure 7:
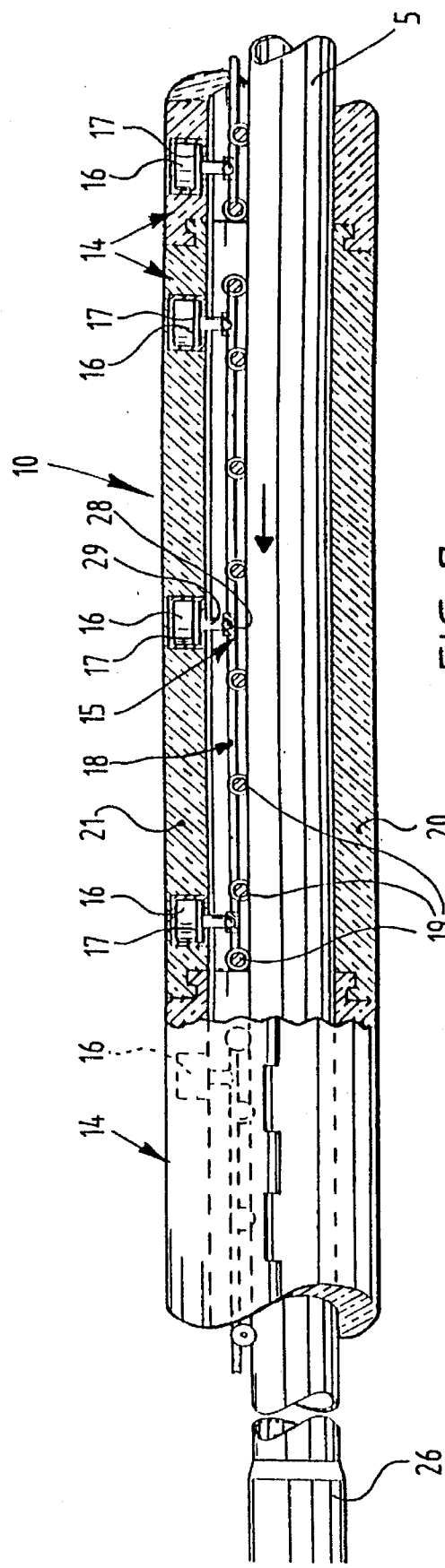
FIG. 7 shows on larger scale a broken away view of fraction VII of FIG. 1.
Figure 8:
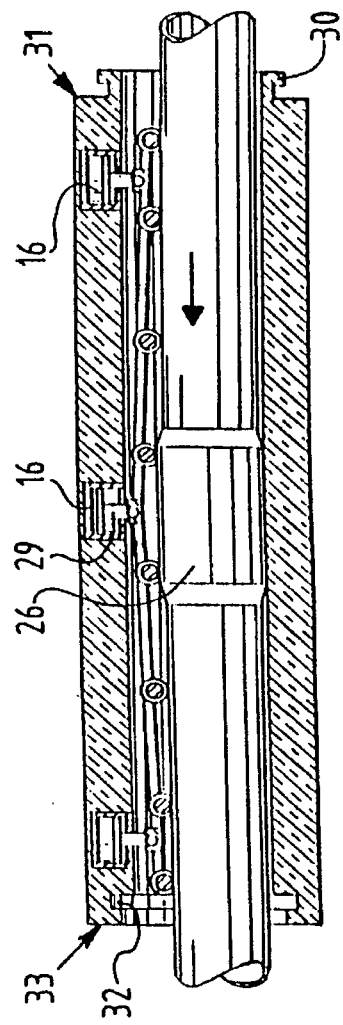
Figure 11:
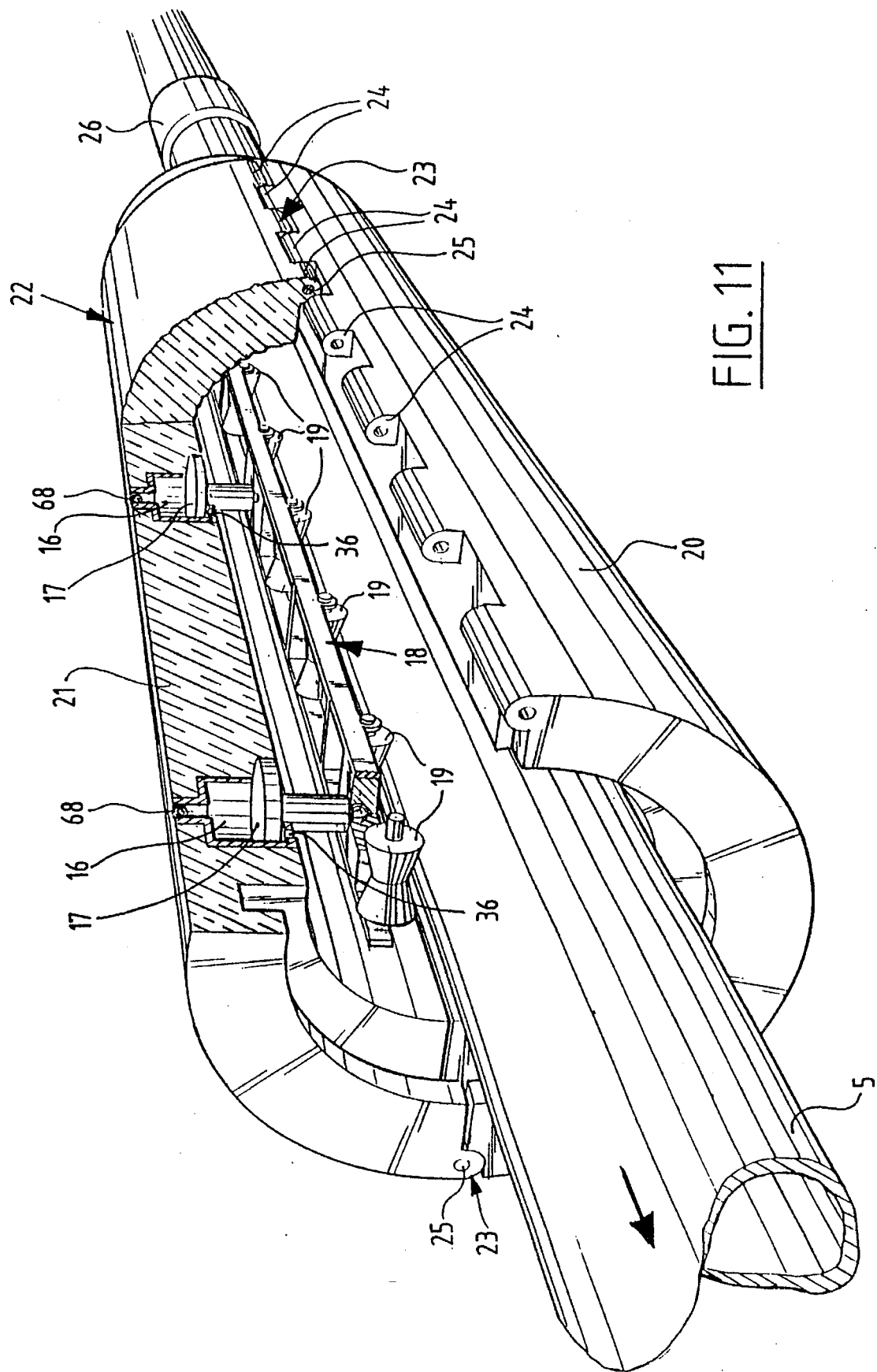
Figure 12:
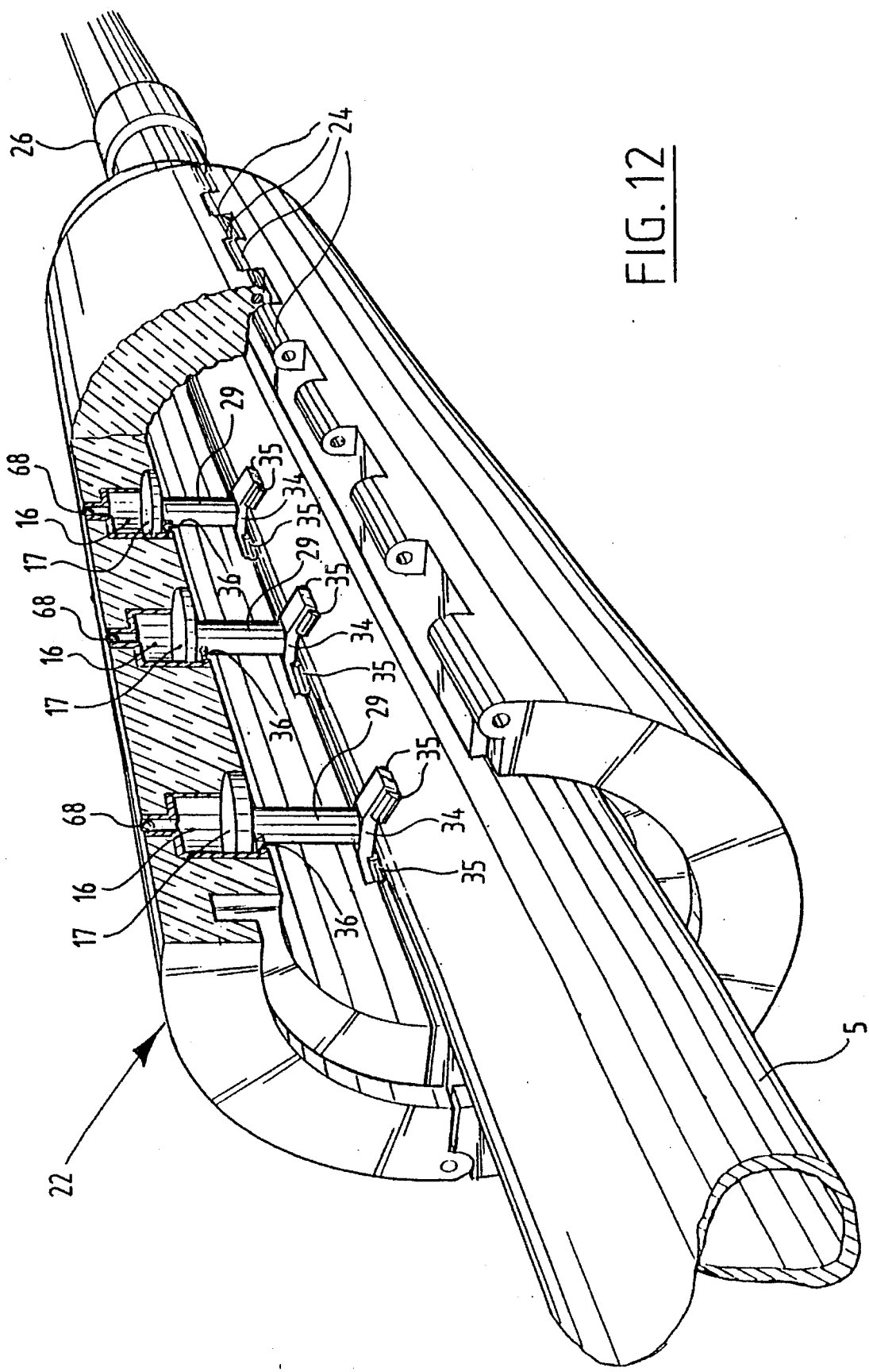
Figure 19:
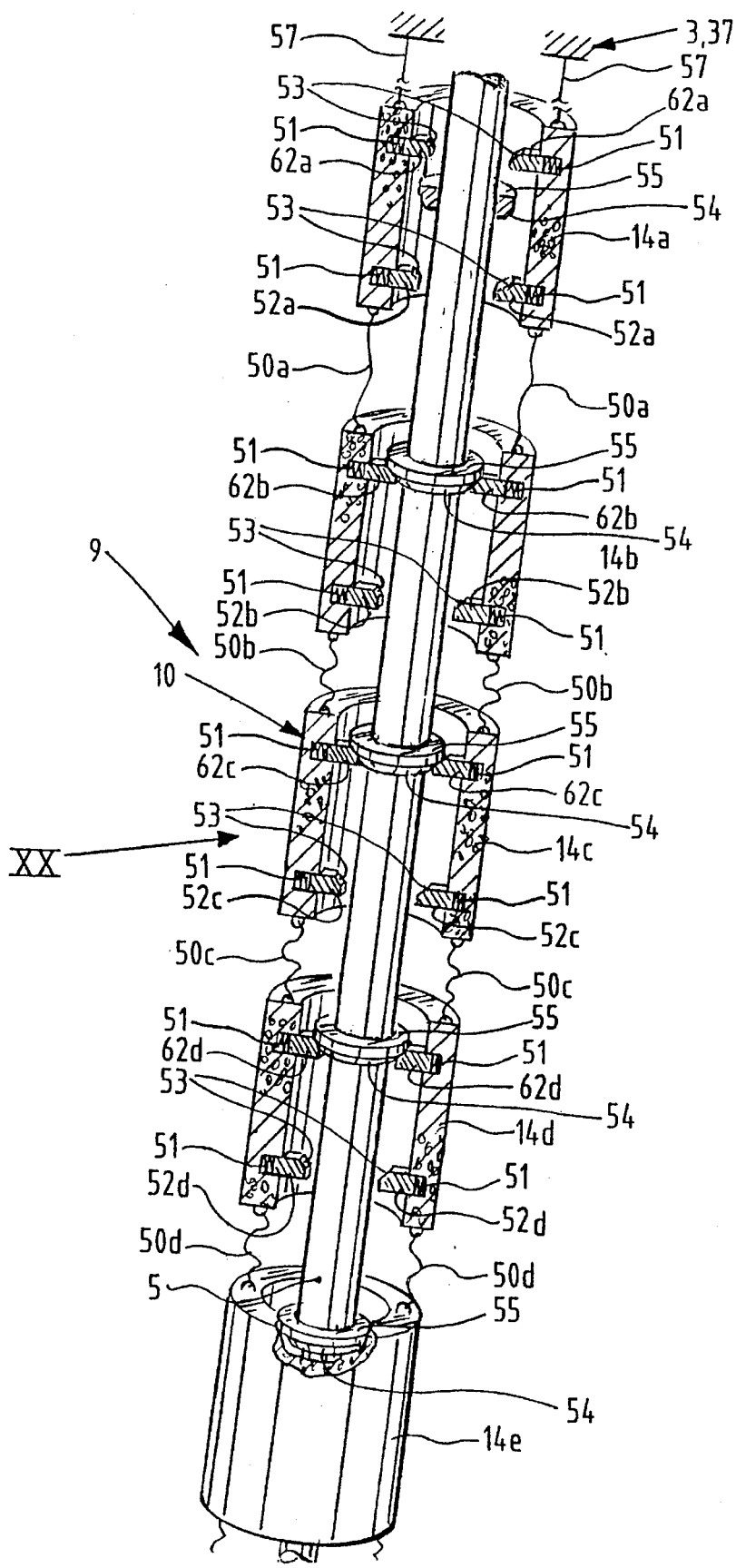
Figure 20:
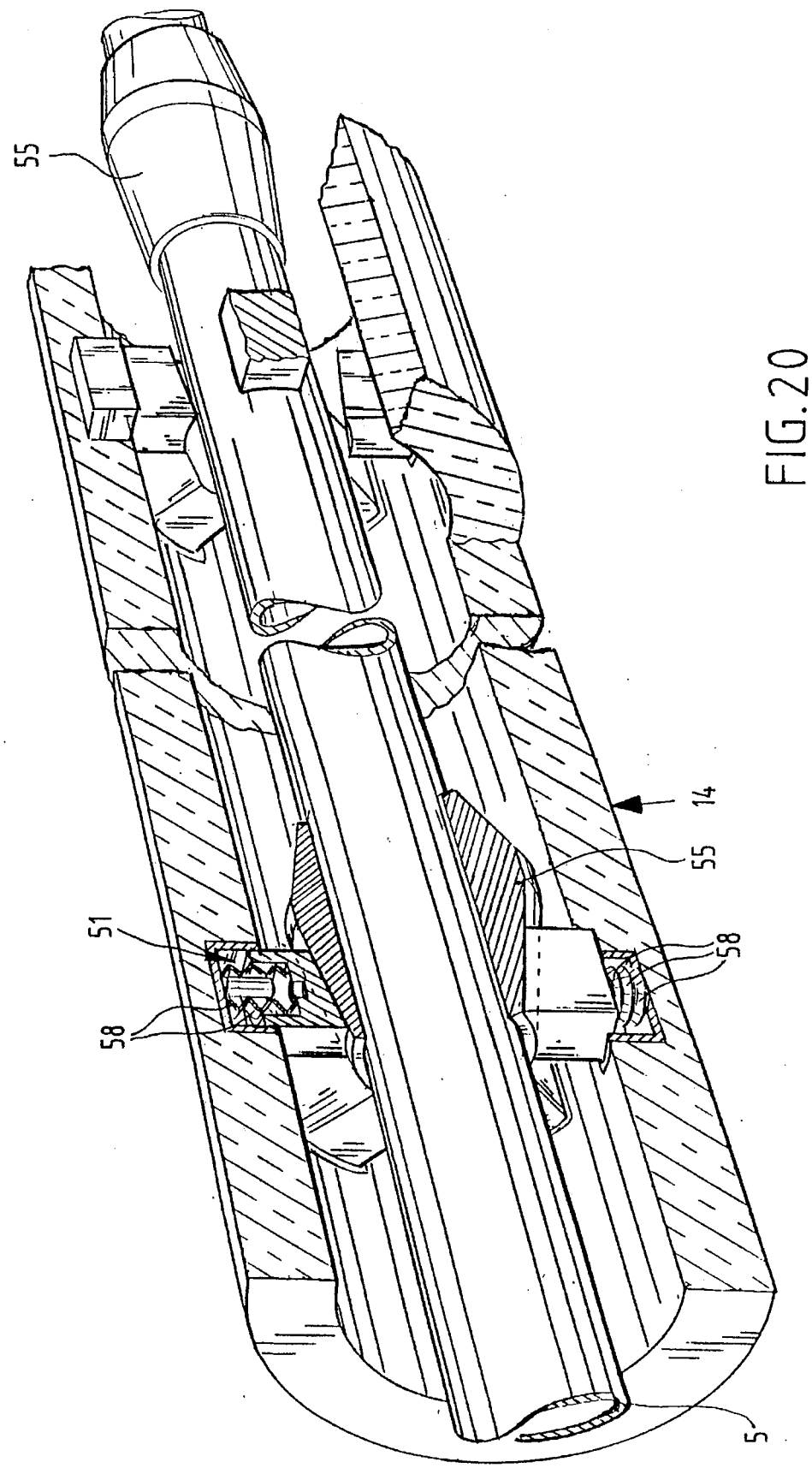
Figure 24:
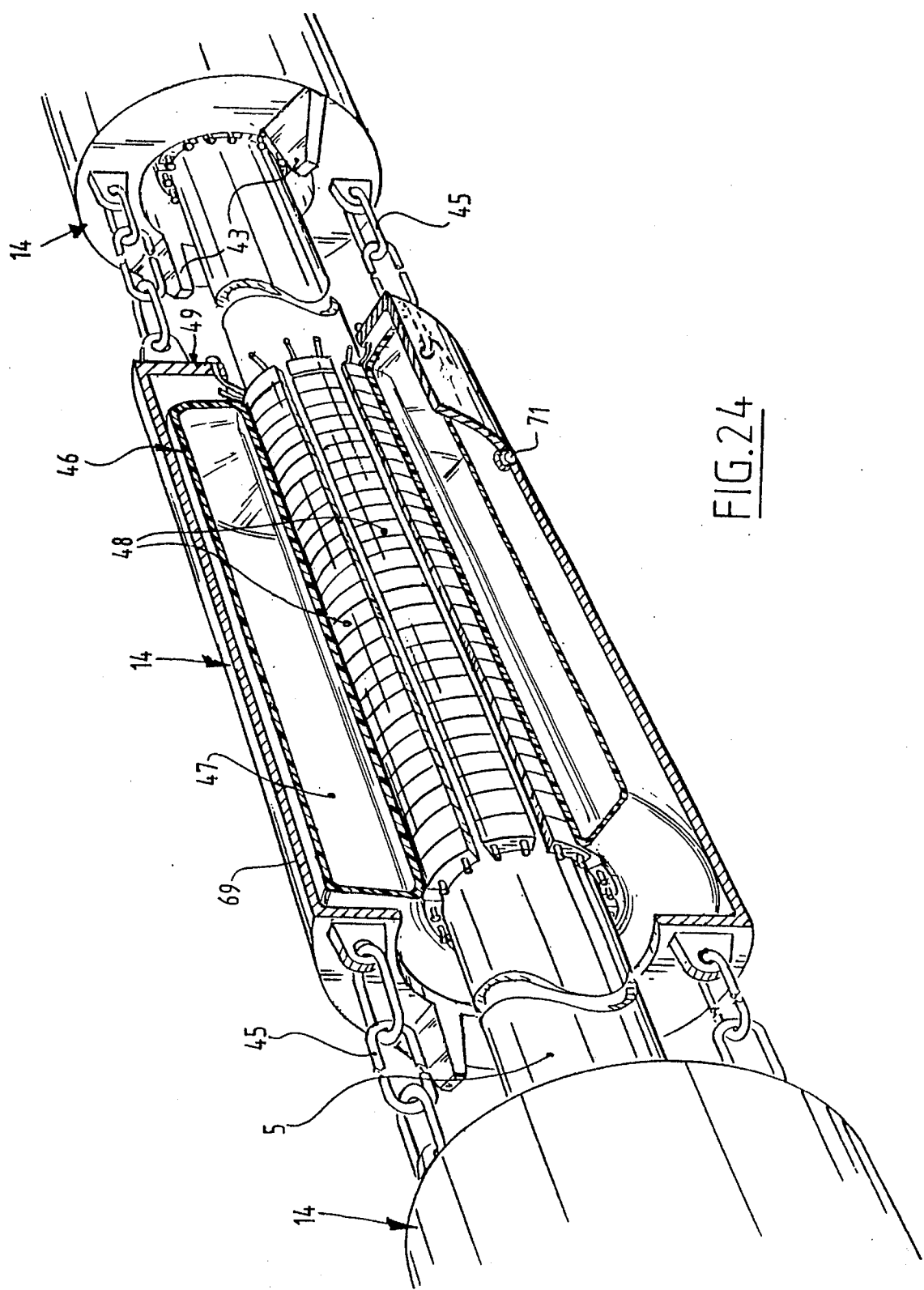
Figure 25:
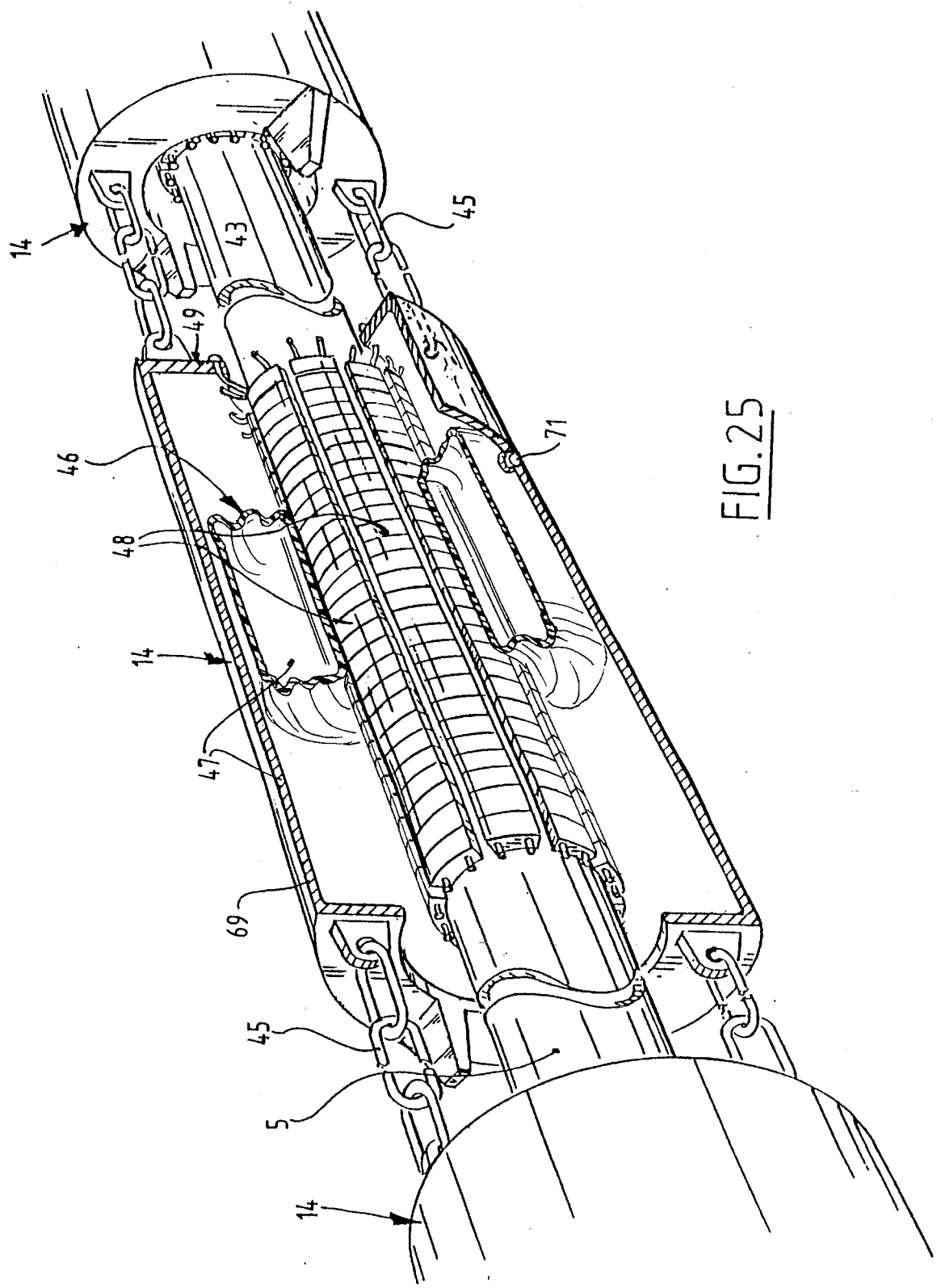
Figure 26:
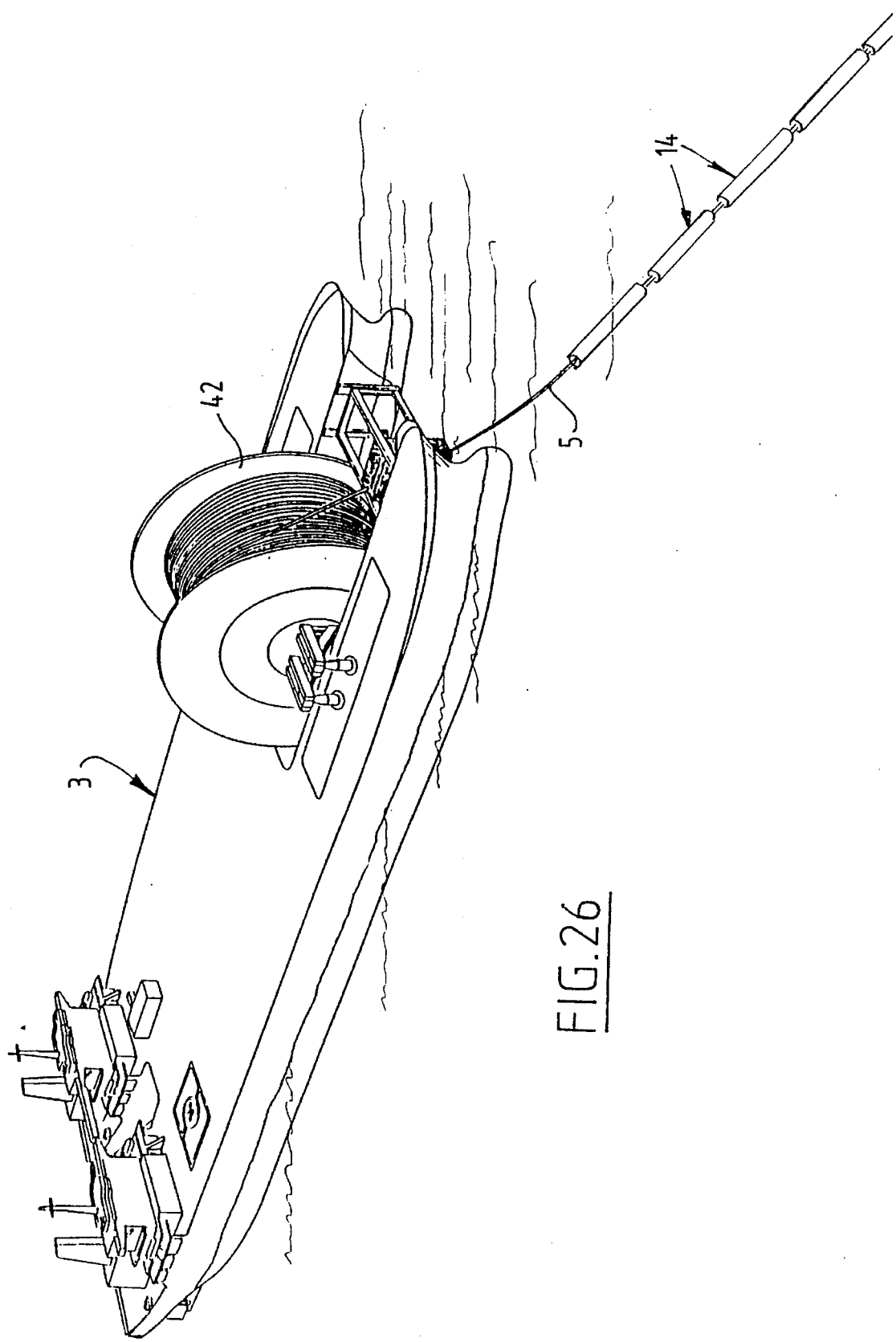
Figure 27:
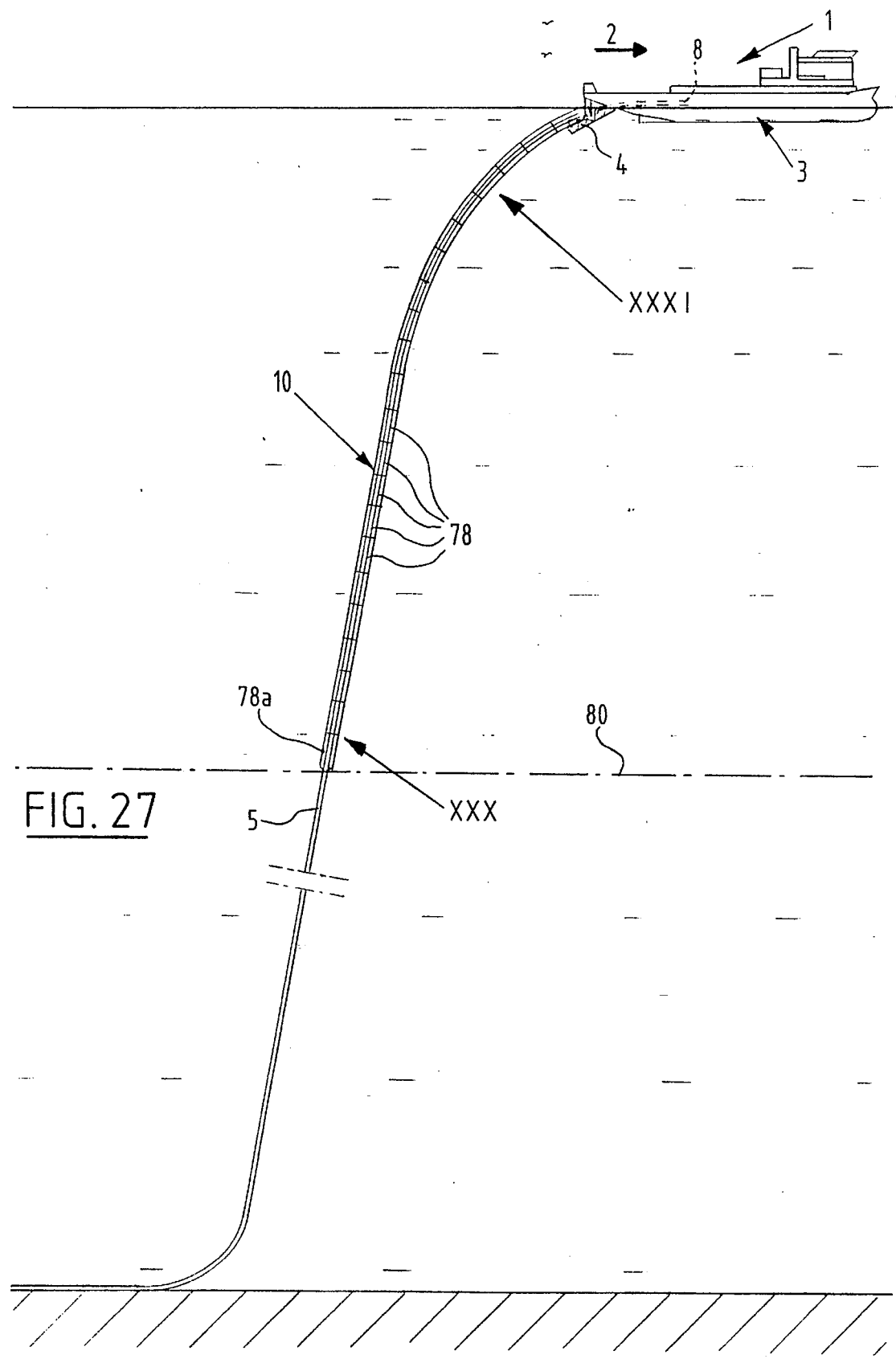
Figure 31:
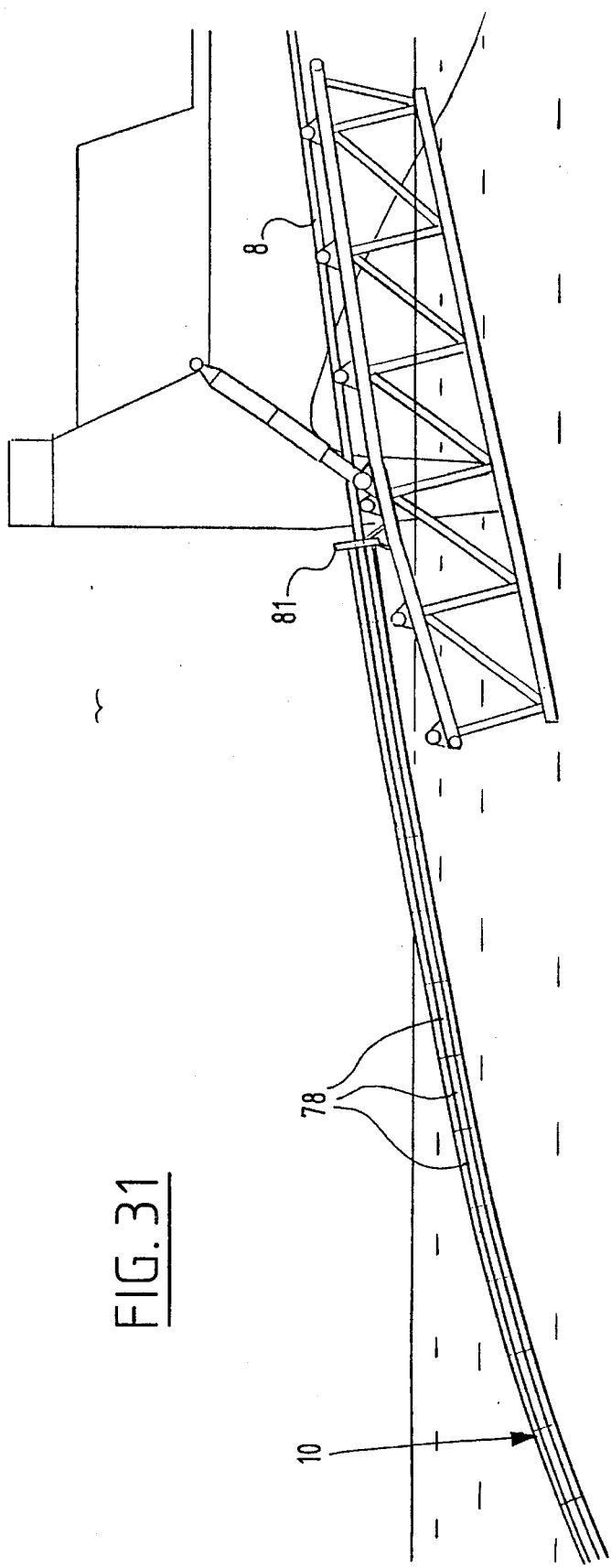
Figure 32:
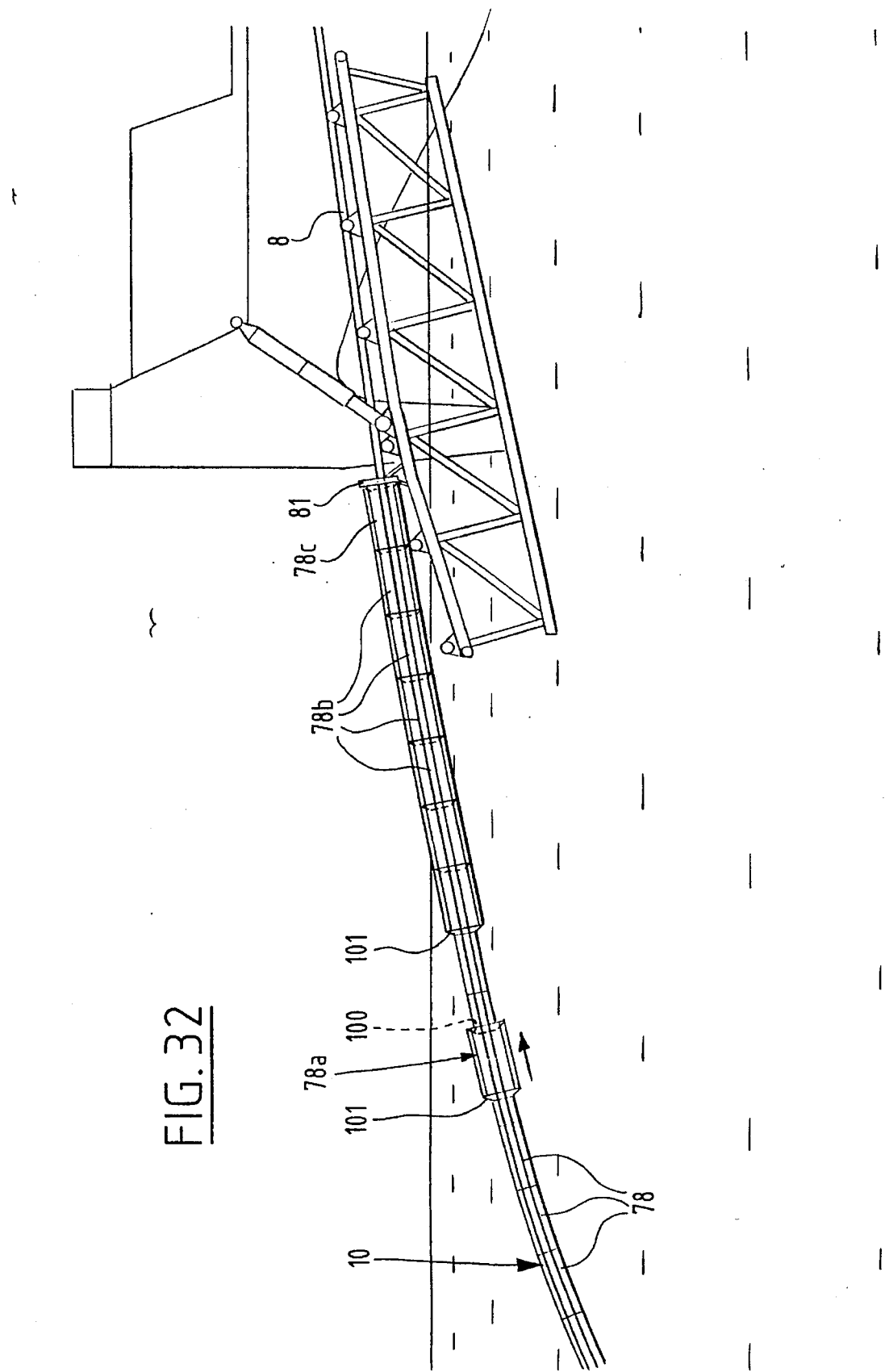
Figure 33:
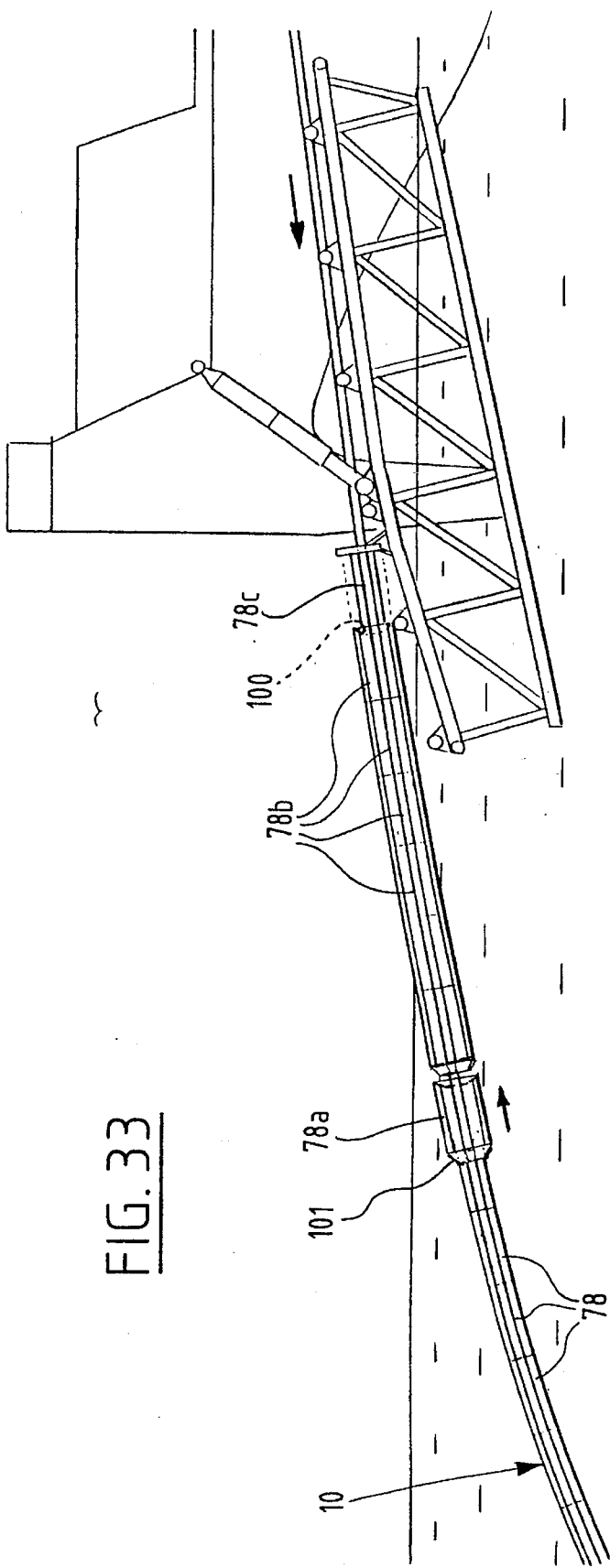
Figure 34:
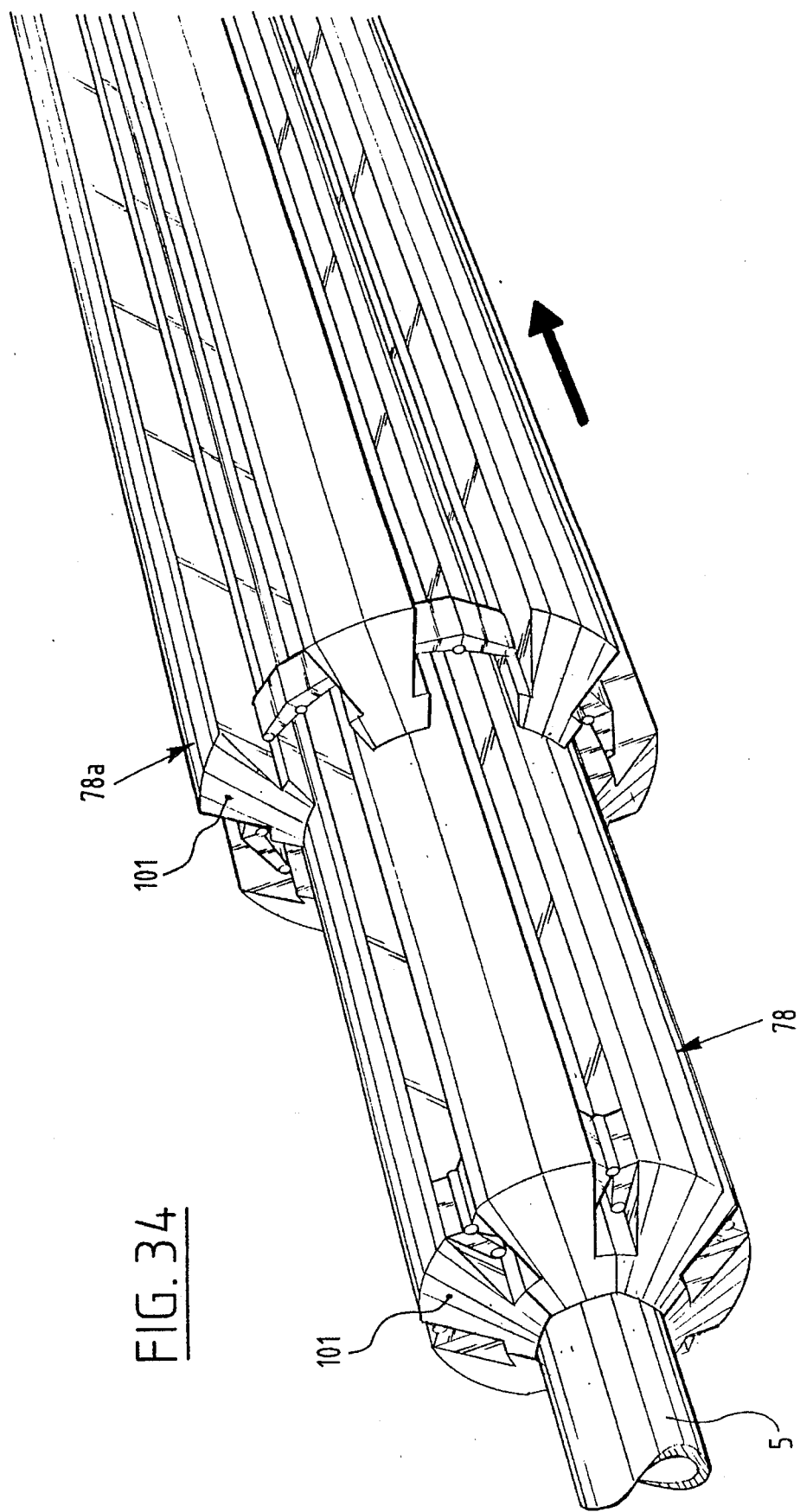
Figure 35:
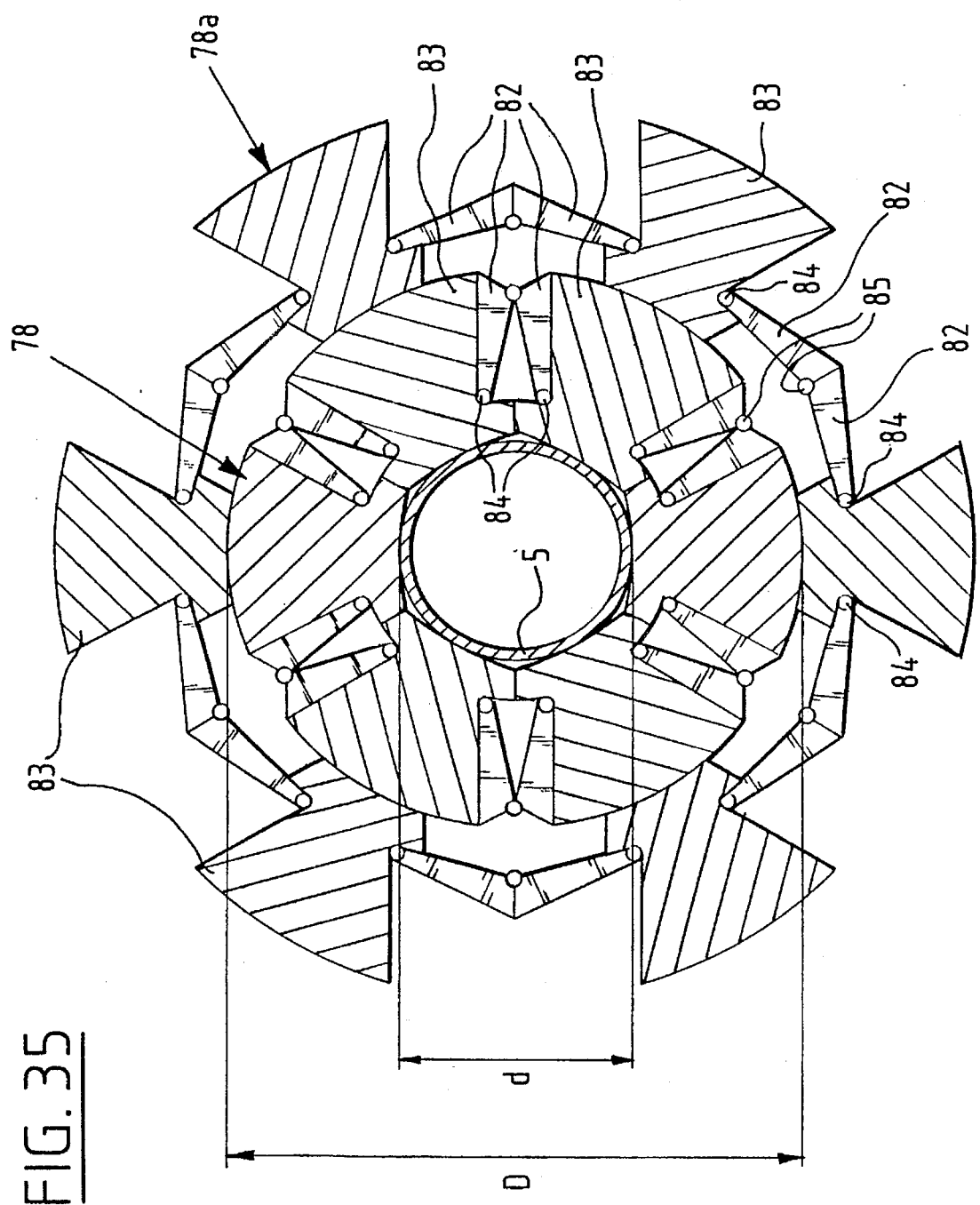
Figure 36:
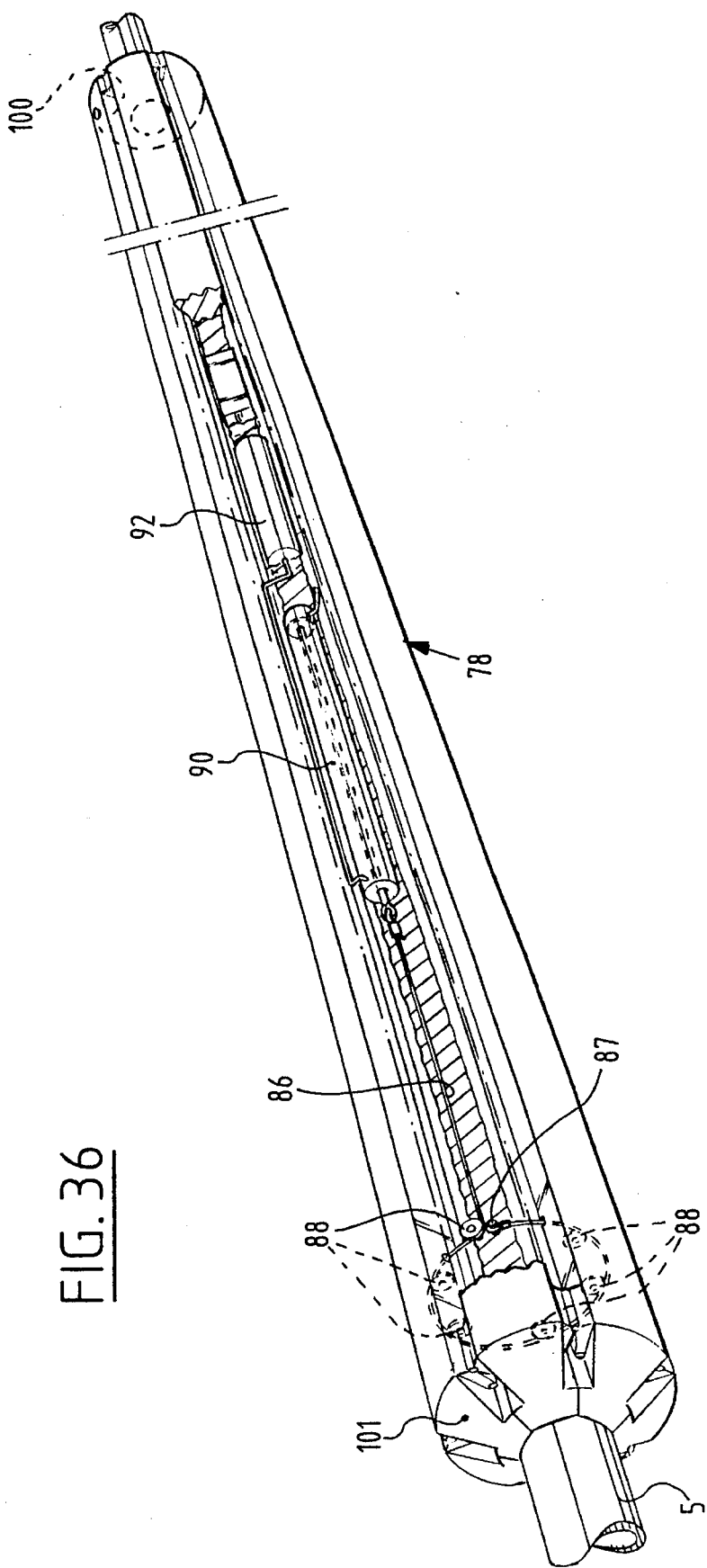
Figure 37:
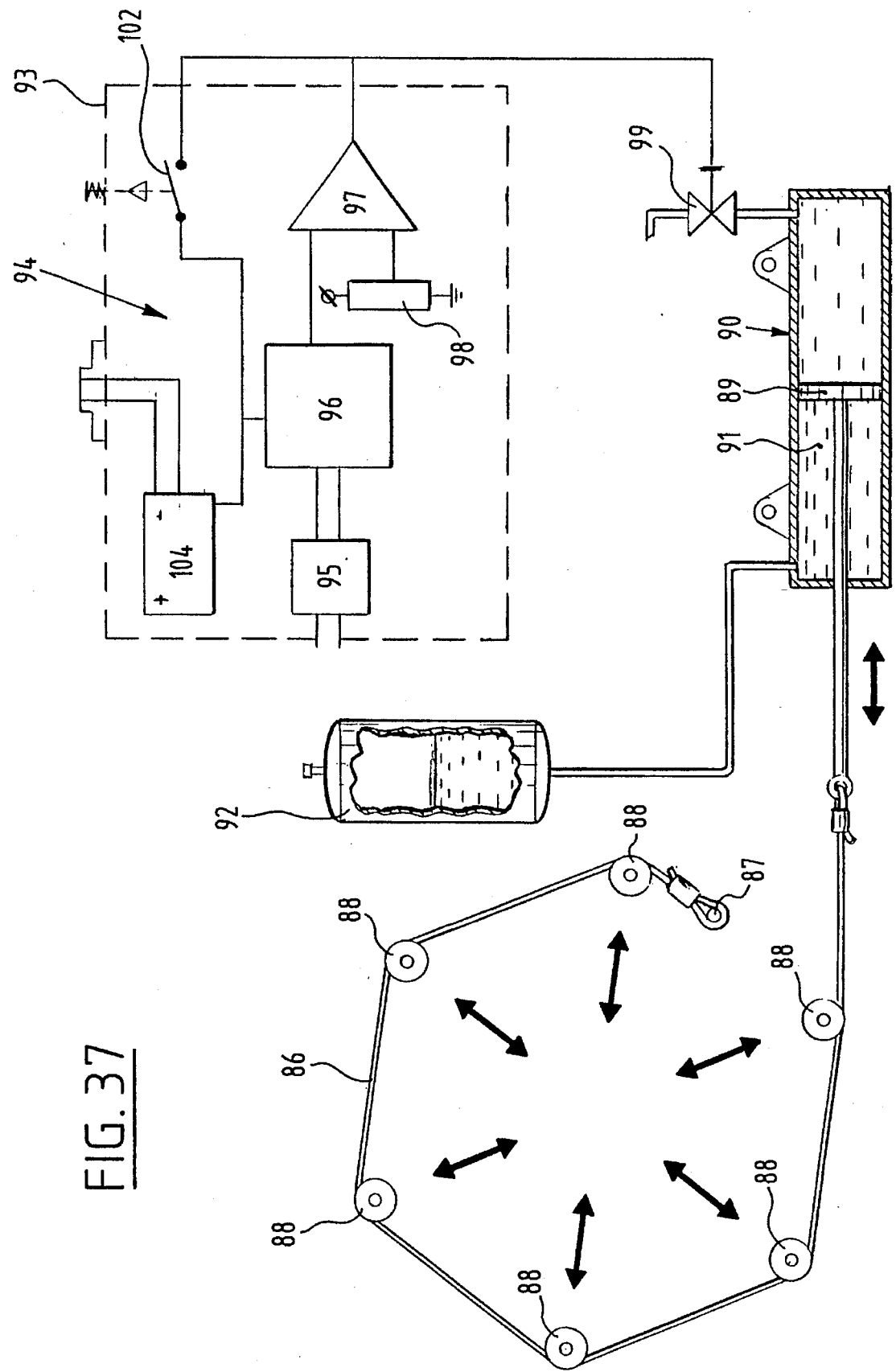
Figure 38:
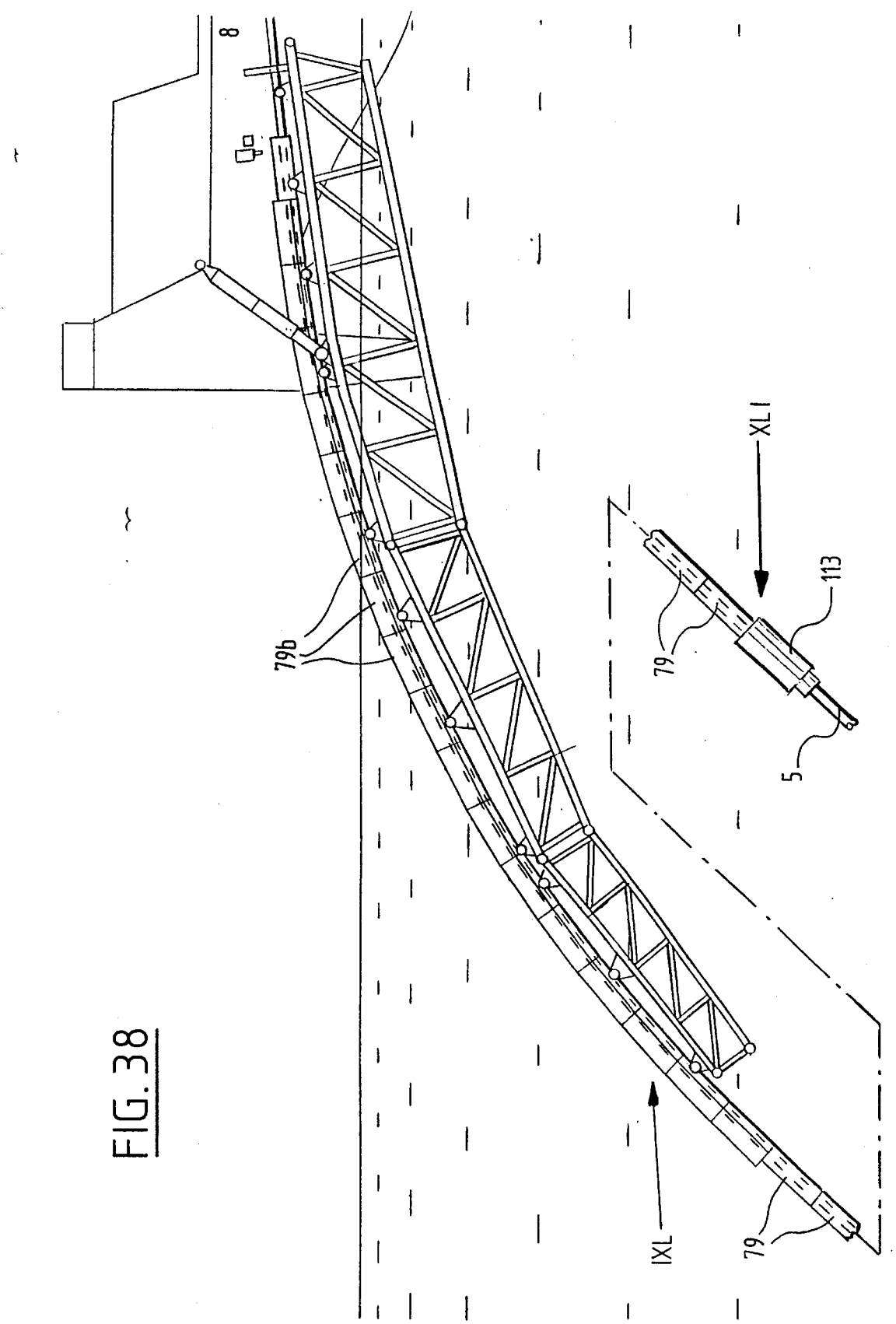
Figure 39:
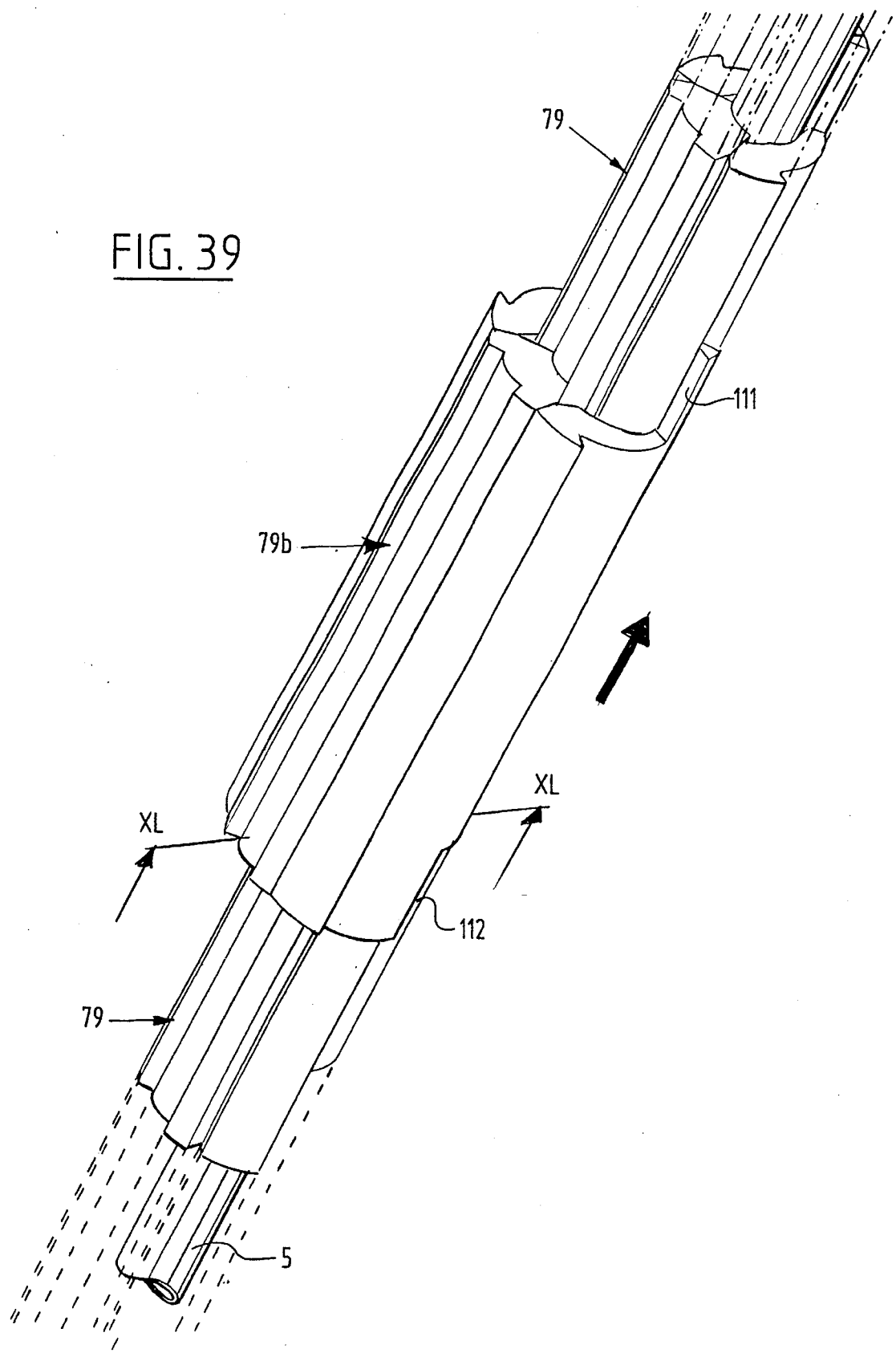
Figure 43:
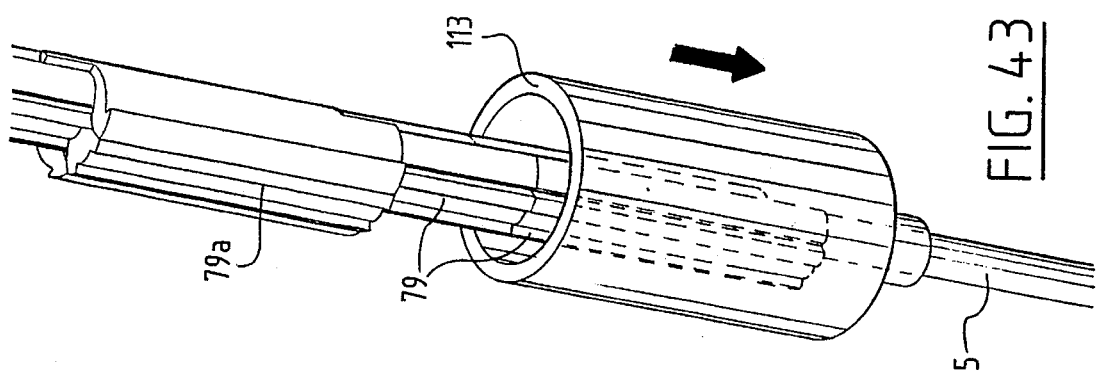
Figure 42:
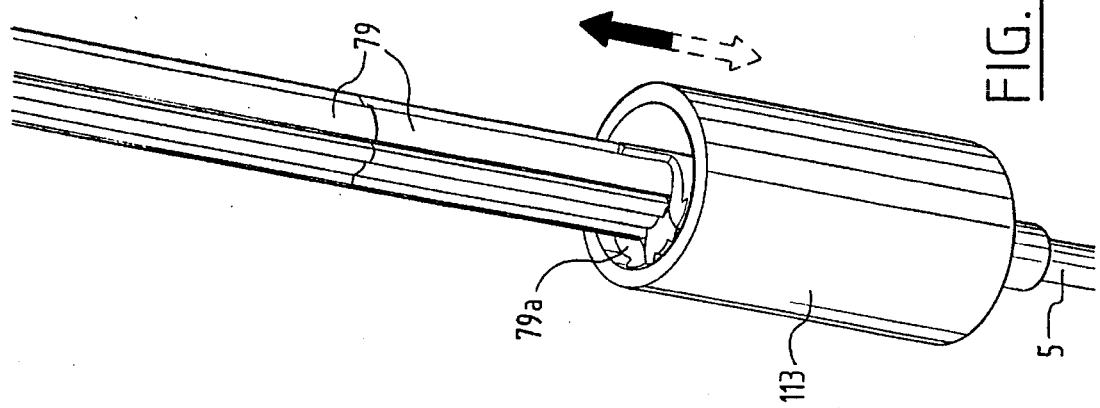
Figure 41:
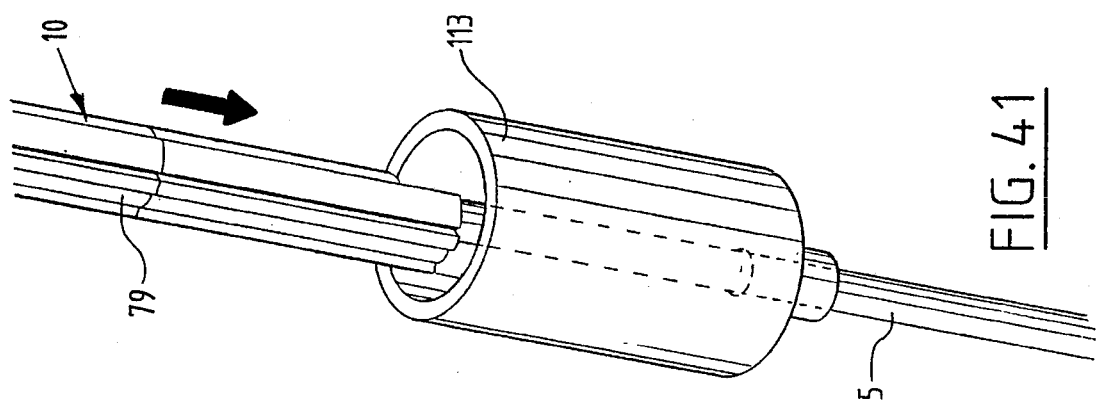
Figure 48:
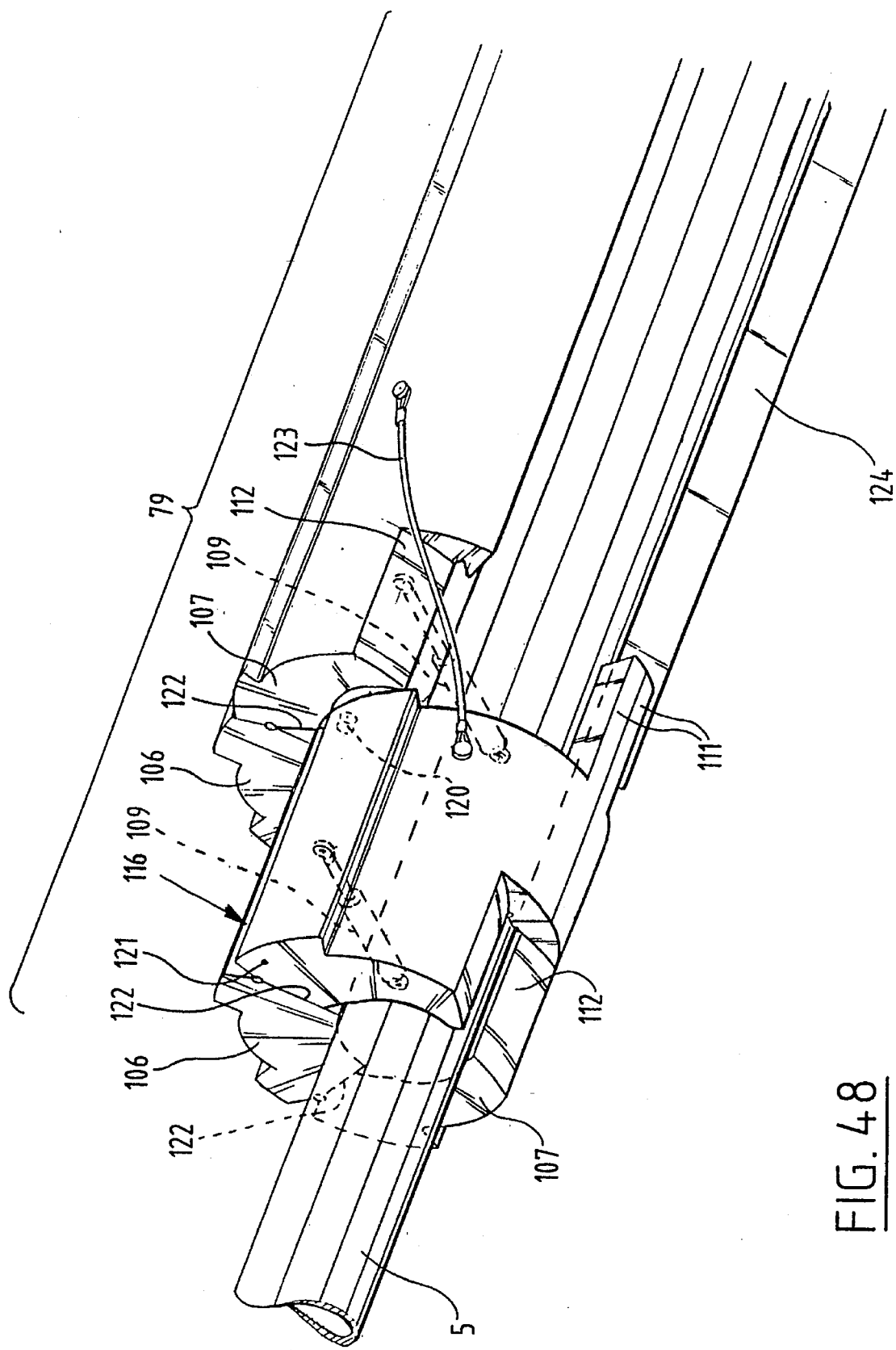
Figure 49:
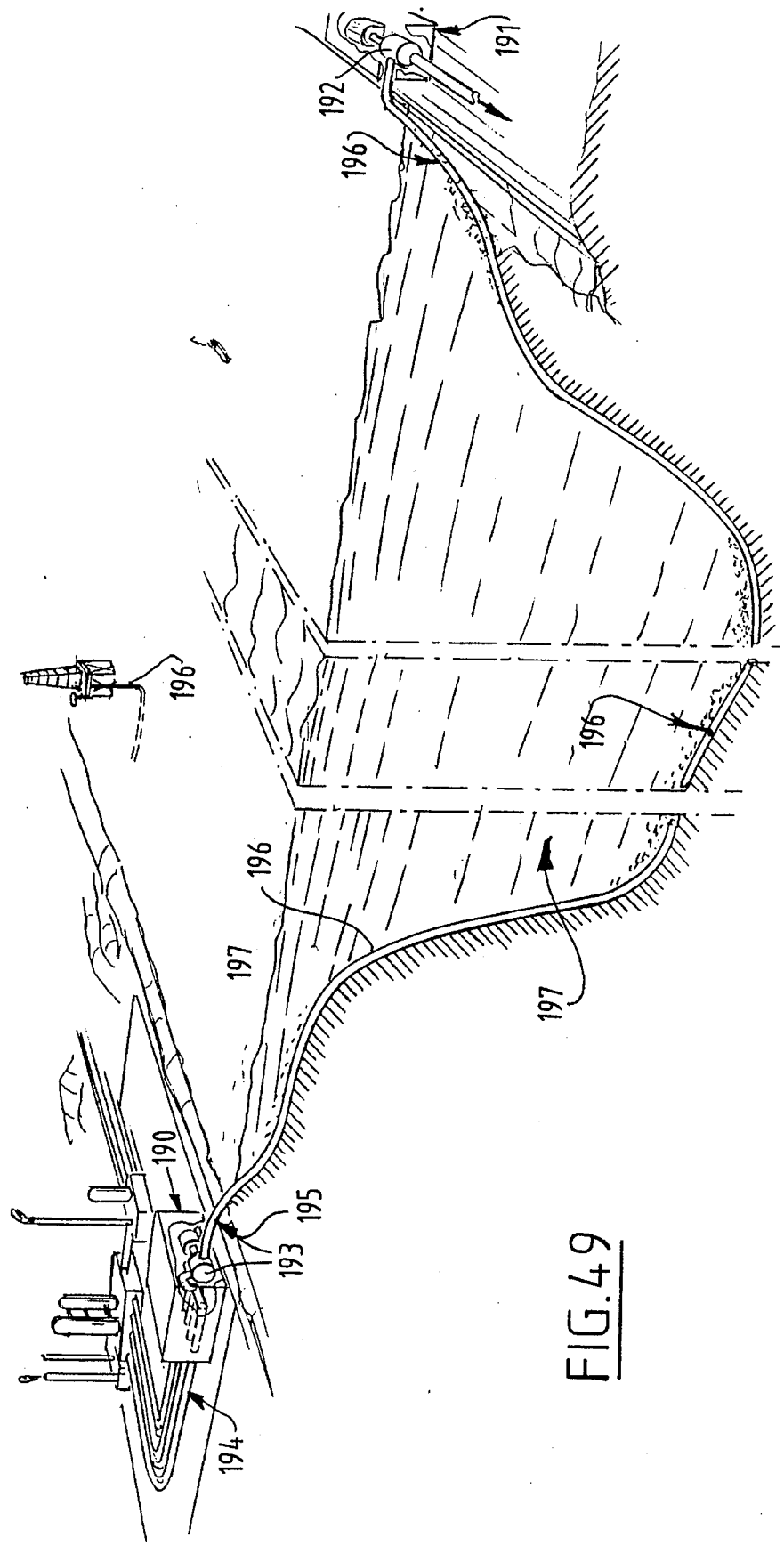

FIGS. 8, 9 and 10 each show a section corresponding with FIG. 7 having a different relative position compared to a pipe string with a thickening, for instance anode;

FIG. 11 shows on larger scale a perspective broken away view of a fragment of the detail of FIG. 7;

FIG. 12 shows a view corresponding with FIG. 11 of an embodiment variant;

FIGS. 13, 15, 16, 18, 21, 26, 27 and 38 show in each case a different installation according to the invention;

FIG. 14 shows on larger scale detail XIV of FIG. 13;

FIGS. 17, 19, 23 and 24 each show a perspective view of a fraction of another installation according to the invention;

FIG. 20 shows on larger scale detail XX of FIG. 19;

FIG. 22 shows on larger scale detail XXII of FIG. 21;

FIG. 25 shows the fraction of FIG. 24 at a greater water depth;

FIGS. 28–30 show fraction XXX of FIG. 27 in successive stages during performing of the method according to the invention;

FIGS. 31–33 show on a larger scale fraction XXXI of FIG. 27 in successive stages during performing of the method according to the invention;

FIG. 34 shows on larger scale fraction XXXIV of FIG. 30;

FIG. 35 shows on larger scale the section XXXV—XXXV of FIG. 30;

FIG. 36 shows on larger scale a broken away perspective view of detail XXXVI of FIG. 30;

FIG. 37 shows a diagram of the drive means of a trunk element of FIG. 36;

FIG. 39 shows on larger scale fraction IXL of FIG. 38;

FIG. 40 shows on larger scale the section XL—XL of FIG. 39 with a diagram of the drive means;

FIGS. 41–43 show on larger scale detail XLI of FIG. 38 in successive stages;

FIGS. 44–47 show the bottom end of a differently formed trunk according to the invention in successive stages; and FIG. 48 shows on larger scale detail IIL of FIG. 46 and FIG. 49 shows terminals with a pipe string laid in deep sea.

The installation 1 of FIG. 1 comprises a per se known pipe-bedding installation 3 which is driven in arrow direction 2 by its propulsion screws and which has at its rear end a so-called stinger 4 which guides a pipe string 5 from a lying direction to a steeply downward direction. The pipe-bedding installation is for instance of the type described in GB-A-2232740, the contents of which should be deemed interpolated herein. The pipe string 5 is laid according to the invention on a deep, for instance 1–3 km-deep, seabed 6. On board pipe-bedding installation 3 the pipe string 5 is lengthened by welding thereon one subsequent pipe at a time or a plurality of pipes simultaneously. The pipe string is moreover held on board pipe-bedding installation 3 using draw benches, while the pipe string is lowered into the water gradually or in steps. The upper end 8 of pipe string 5 is preferably situated on board pipe-bedding installation 3 in lying position, although welding of pipes in upright position, wherein pipe string 5 is suspended, is conceivable, as is unwinding of a pipe string 5 from a coil 42 as according to FIG. 26. In the pipe-bedding installation 3 of FIG. 1 there would be the danger in the case of laying pipes at great depth of the bottom end 7 of stinger 4 being under too strong a bending load.

In the method according to the invention the part of the pipe string 5 situated between pipe-bedding installation 3 and the seabed 6 is at least partially supported by means of buoyancy means 9 which have a lifting power. In FIG. 1 the buoyancy means consist of a trunk 10 of light material through which the pipe string 5 passes. Trunk 10 consists of mutually coupled trunk tubes 14 which are for instance 6 meters long and provided with contact means 15 which engage on pipe string 5. The contact means 15 consist according to FIGS. 7–11 for instance of air cylinders 16 which are disposed radially in top brasses 21 of trunk 10 and in which a piston 17 is slidable, under the influence of the local hydrostatic pressure, counter to the air pressure prevailing in air cylinder 16. The air pressure in air cylinder 16 is preferably chosen such that it overcomes the hydrostatic pressure as long as the trunk 10 is situated a small distance a from the stinger end 7. In this case the air cylinders 16 clamp the pipe string 5 fixedly against the bottom brass 20 of trunk 10 via a train of diabolo rollers 19. The trunk 10 then moves downward with the pipe string 5 until the hydrostatic pressure approaches the air pressure of air cylinders 16. The clamping pressure of the contact means 15 is then too low to hold the pipe string 5 securely, so that the trunk 10 shifts upward relative to pipe string 5. A balance is thus created wherein trunk 10 remains practically in position and the pipe string is held fast under a determined friction force. The pipe string 5 thus undergoes a determined upward force which considerably reduces the tractive force to be produced by the pipe-bedding installation 3. This upward force can be increased as required by lengthening the trunk 10 or by increasing the buoyancy capacity per meter of trunk. In order for instance to lay pipelines of steel with a wall thickness of 4 cm and a diameter of 60 cm, which pipeline weighs 300 kg/m underwater, an upward force is created of preferably a minimum of 900,000 kg at a sea-depth of 3 km. For this purpose a trunk 10 is then employed for instance with a length of 600 m and with an upward force of 1000 kg/m. The draw benches on board the pipe-bedding installation then provide the rest of the required tractive force. The trunk 10 consists for instance of trunk tubes 22, each of two brasses 20, 21 which are mutually joined by means of two hinges 23 with mutually fitting hinge pieces 24 with an axial rod 25. The brasses consist of a per se known plastic with hollow glass beads known as "syntactic foam" and commercially available for instance under the name "Hisyn". This material retains its high buoyancy capacity at high hydrostatic pressure and can be manufactured with a specific gravity of 460–640 kg/m.

According to FIG. 3 an anchoring system, for instance an anchor 11 on a cable 12, is let down to the seabed 6 from pipe-bedding installation 3. This cable 12 is fixed to the end 13 of the pipe string 5.

The trunk tubes 22 are preferably attached round the pipe string on board the pipe-bedding installation 3 (FIG. 4), which is possible because they consist of half brasses 20, 21. Because the trunk tubes 22 clamp fixedly on the pipe string 5 they will move therewith in the direction of the seabed 6 (FIG. 5) until the above mentioned balance of FIG. 6 is achieved.

To prevent corrosion the pipe string 5 has anodes 26 which consist of local thickenings. In order to enable passage of these anodes 26, the train 18 consists of frames 27 which hinge mutually at the coupling of the piston rods 29.

The brasses 20 and 21 have on their upper ends 31 coupling flanges 30 which fit into ring hole 32 at the lower ends of an adjacent tube 22.

The trunk tube 22 of FIG. 12 has piston rods 29 each directly supporting at their free ends 34 four rollers 35 which engage on the pipe string 5.

FIGS. 11 and 12 show openings 36 along which the hydrostatic pressure enters the piston rod chambers of cylinders 16.

The installation 1 of FIG. 13 comprises in addition to pipe-bedding installation 3 a pontoon 37 which is pulled along by pipe-bedding installation 3 by means of pulling cables 38. This pontoon 37 forms buoyancy means and carries winches 39 on which the pipe string 5 is suspended via hoisting cables 40 and steel clamping tubes 41 engaging round pipe string 5. Arranged on each clamping tube 41 are air cylinders 16, pistons 17 of which clamp the pipe string 5 against the underside of tube 41 via rollers 19. The winches 39 are paid out with set braking moment such that they produce a considerable upward force. Tubes 41 move so far downward that the hydrostatic pressure approaches the clamping pressure of cylinders 16 and the clamping force is insufficient to couple the tubes 41 to the pipe string 5, so that the winches 39 then pull tubes 41 upward. Here again a balance is achieved.

Figure 15:
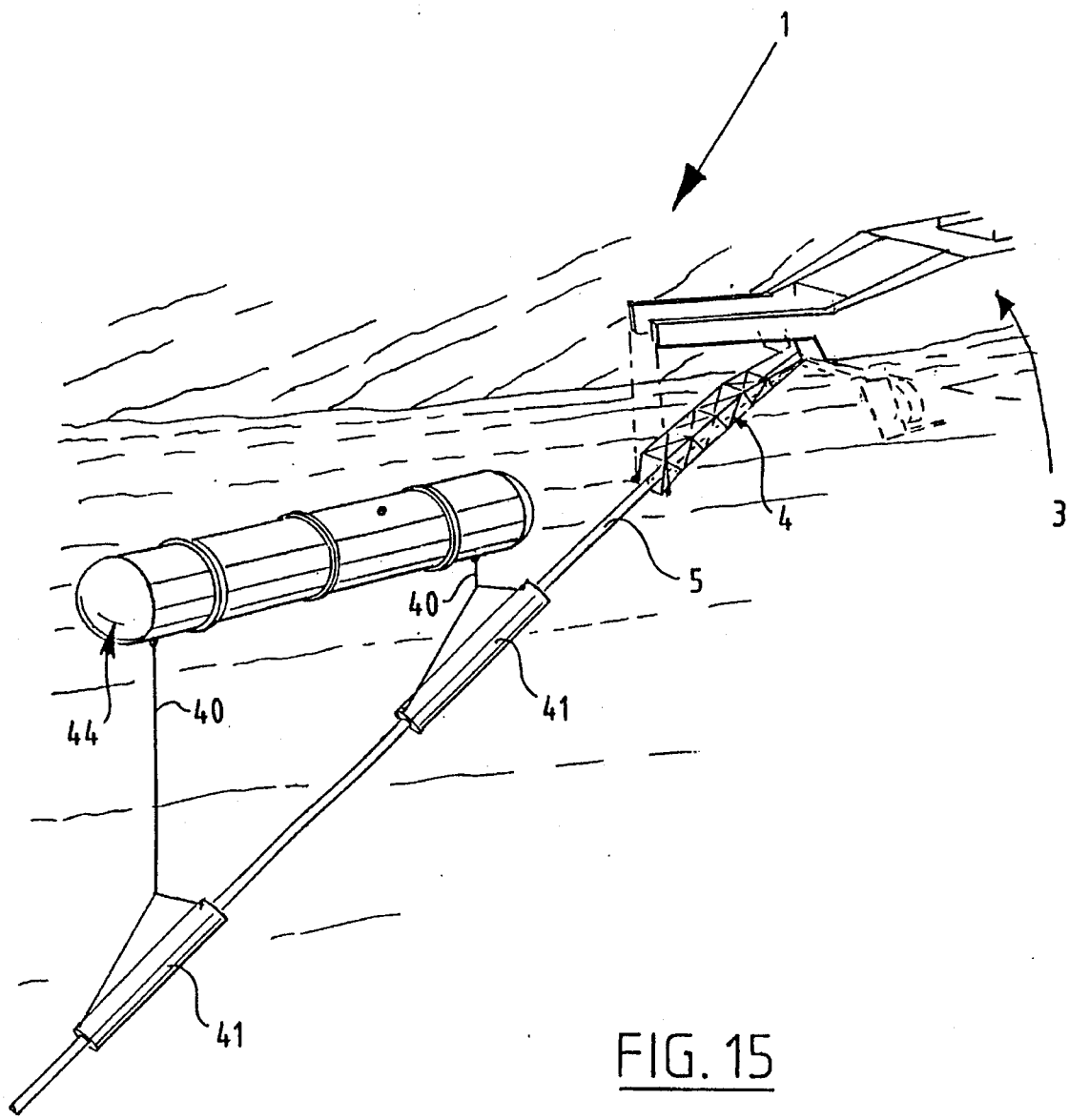
Figure 16:
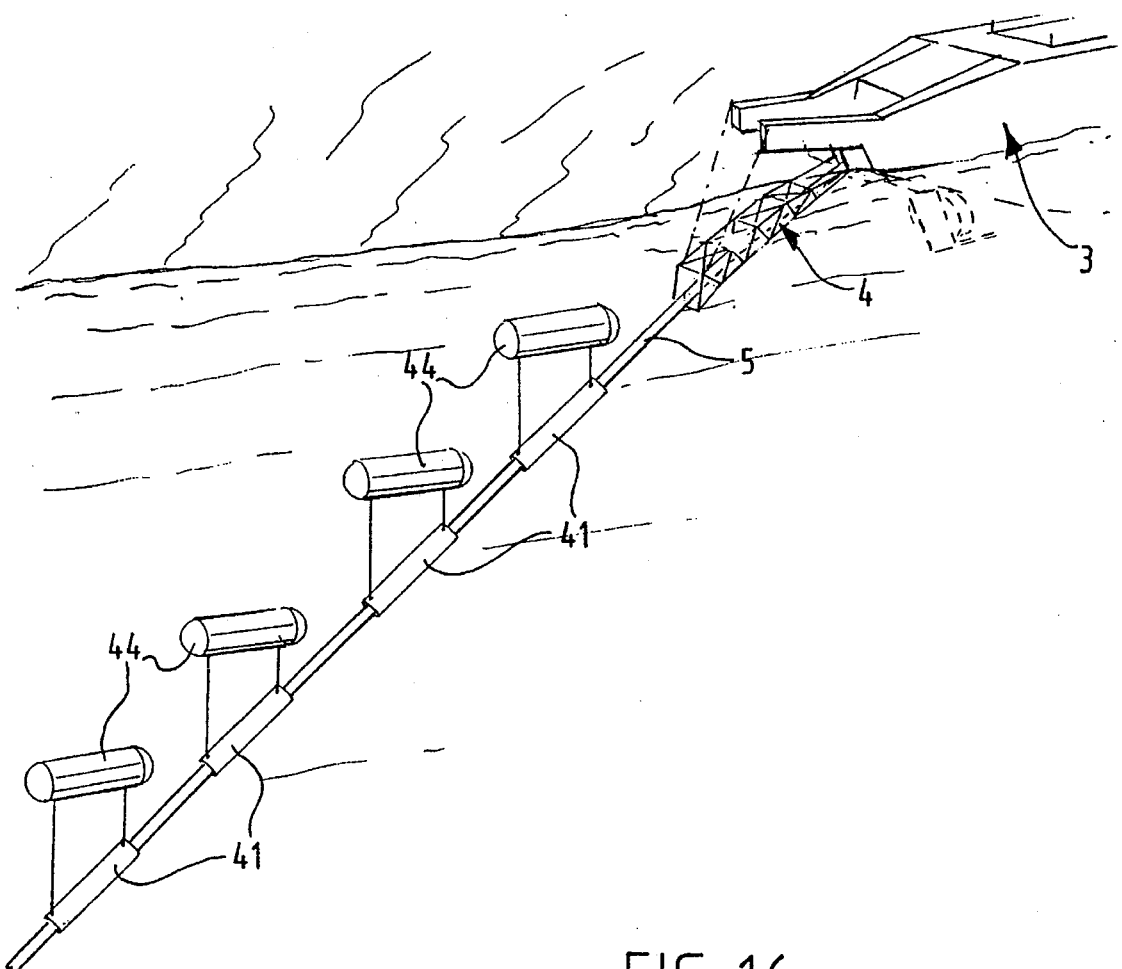

According to FIG. 15 the pontoon 37 is replaced by a sturdy air tank 44 which is preferably under high pressure so that it can if necessary withstand the high hydrostatic pressure near the seabed. With its upward driving force the air tank 44 now supplies the required upward force with which the pipe string 5 is partly supported. Two steel pipes 41 as according to FIG. 14 are suspended from the air tank 44. As according to FIG. 16 a plurality of small air tanks 44 is preferably used, each pulling upward a pipe 41 of FIG. 14.

Figure 17:
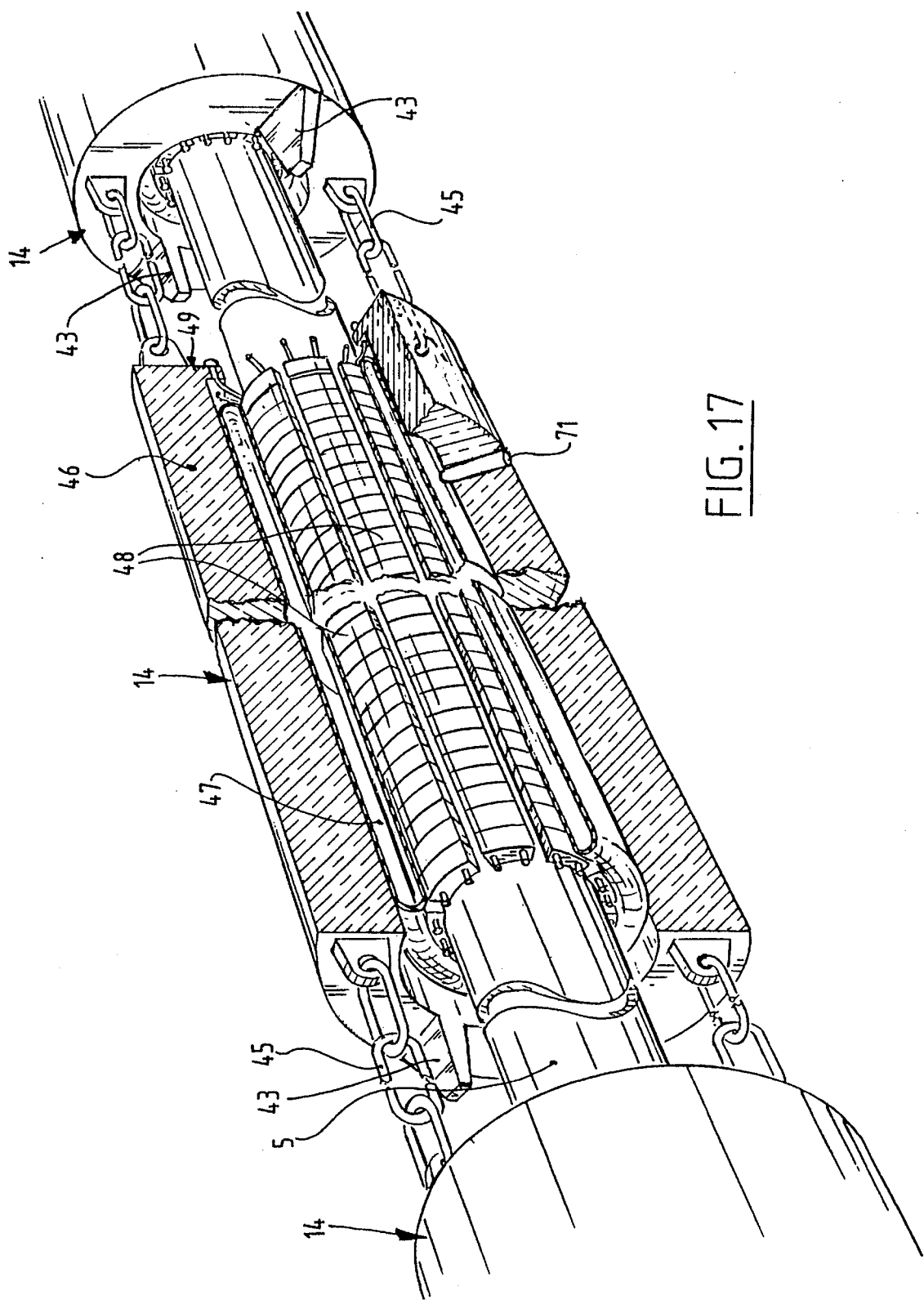

According to FIG. 17 a plurality of trunk tubes 14 are mutually coupled with chains 45, while cams 43 absorb mutual pressure forces of the trunk tubes 14. The tubular body 46 of syntactic foam has on its inside a tubular air bag 47 which presses against the pipe string 5 a number of abrasive strips 48 distributed over the periphery and extending axially along pipe string 5. The strips 48 are secured to the upper end 49 of the trunk tube 14. Under the influence of increasing hydrostatic pressure the bearing pressure of the strips 48 against pipe string 5 will decrease and the trunk tubes 14 will no longer move downward with the pipe string.

According to FIG. 19 a trunk 10 is suspended with cables 57 in steeply upright position on the pipe-bedding installation 3. In the case of a pipe-bedding installation 3 with a horizontal welding street the trunk 10 of FIG. 19 will be suspended with cables 57 on the stinger 4 or on a pontoon 37.

The buoyancy means 9 of FIG. 19 consist of a trunk 10 of trunk tubes 14 which are mutually joined by means of cables 50. The trunk tubes 14 of syntactic foam each contain radially guided contact blocks 52 and 62 with oblique contact surfaces 53 which are urged inward by pressure springs 51 and which co-act with rings 55 arranged on the oblique surfaces 54 of pipe string 5. The trunk tubes 14 each rise individually until contact block 52 or 62 engages on a ring 55 or cannot rise any further because of the limited length of cables 50. On the other hand the trunk 10 will not move any further downward than the length of cables 57 allows. If the tractive force in cables 57 is so high that the uppermost contact blocks give way against their springs 51, the contact surfaces 62b for instance come into co-action with a ring 55 until the tractive force in tightened cable 50a is so high that the contact blocks 62b give way. The other trunk tubes 14 will meanwhile rise until they are stopped by a ring 55 or cannot move any further upward due to tightened cables 50. The trunk 10 will thus move continuously downward over a distance until a series of contact blocks 52 or 62 gives way and the trunk 10 or a part thereof moves upward again.

If instead of by pressure springs the contact blocks 52, 62 of FIG. 19 can be displaced into the path of the rings 54 and also retracted by hydraulic cylinders which can be operated remotely from the pipe-bedding installation, there results a controlled, step-like trunk movement, wherein the axial forces can if desired be distributed over the trunk length.

FIG. 20 shows that each spring 51 can consist of a set of Belleville springs 58. The rings 55 can also form anodes.

The mentioned cylinders 16 are provided with air inlet valves 68 along which they are placed under pressure, this preferably such that the adjusted pressure is higher the greater the depth at which the relevant cylinders 16 are situated during operation, so that the force exerted on pipe string 5 is roughly the same with all cylinders 16. The setting of the air pressures is moreover so high that the trunk 10 is situated at a small distance of for instance 10–15 meters below the stinger 4.

In the variant of FIGS. 13 and 14 shown in FIGS. 21 and 22 hydraulic cylinders 76 are applied instead of air cylinders, which cylinders 76 are fed from pontoon 37 by a fluid pressure aggregate 77 via fluid lines 75 at a determined set pressure which is so great that sufficient friction force is applied to the pipe string 5 such that the clamping tubes 41 are held at the desired depth. The hydraulic pressure in cylinders 76 is herein adapted to the local hydrostatic pressure.

It is possible to also arrange pressure springs in the air cylinders 16 in order to decrease the required air pressure.

The pipe string 5 contains no concrete jacket if it consists of heavy steel pipes.

Trunk 10 is also suitable for a pipe string with concrete jacket. The inside of trunk 10 is optionally provided with a lining with high coefficient of friction and high wear resistance.

Figure 23:
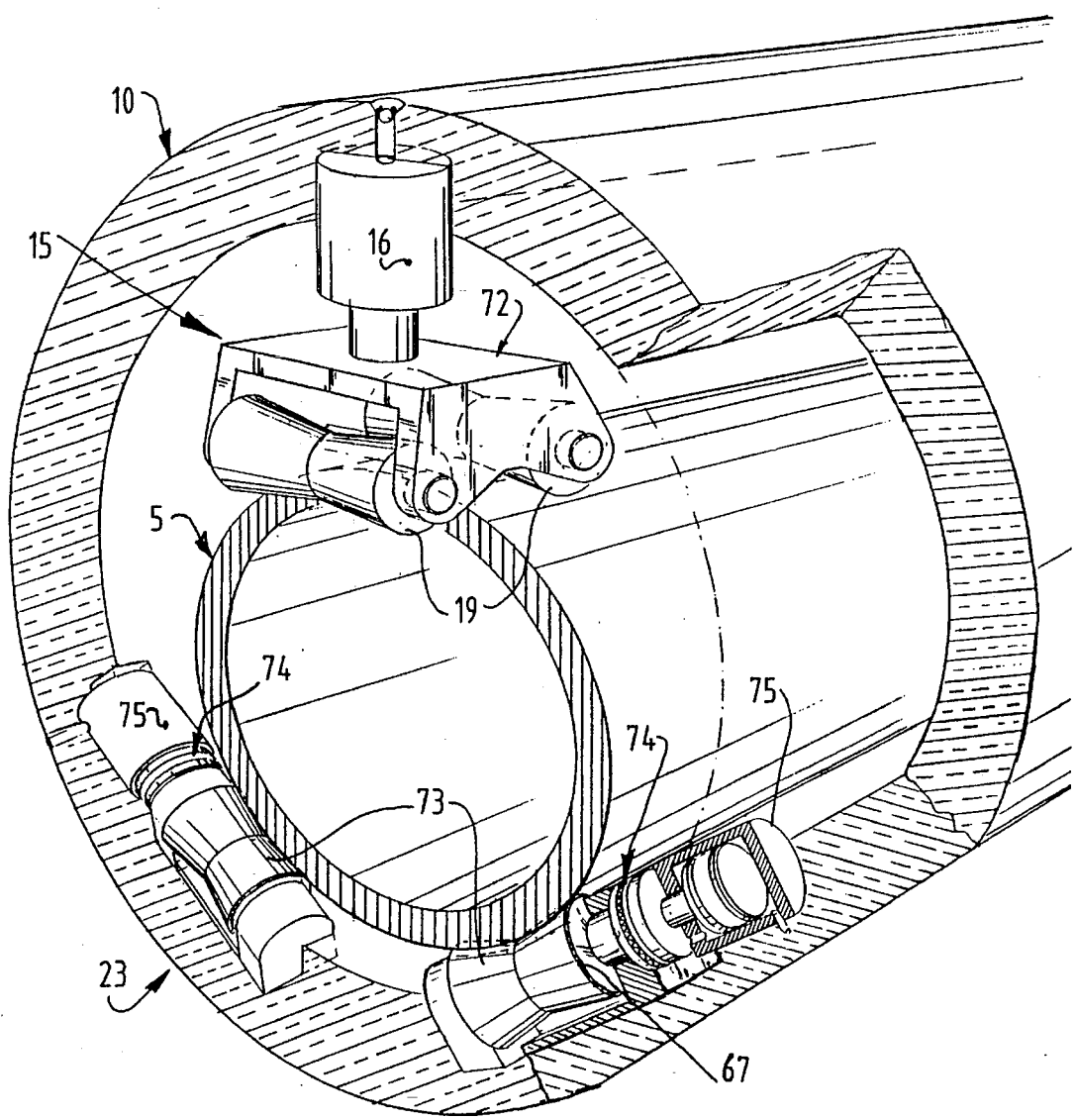

According to a variant the trunk 10 arranged round pipe string 5 has at least at one location the contact means 15 of FIG. 23. These consist of hold-down rollers 19 mounted in a frame 72 which press the pipe string 5 against friction rollers 73 mounted on trunk 10 with an adjusted normal power of an air cylinder 16 or of mechanical springs or with a pressure of hydraulic cylinders 76 which is adjusted at a distance from the pipe-bedding installation 3. These rollers 73 are provided with a friction coupling 74, the normal power of which is regulated by means of hydrostatic pressure and/or pressure of pressure cylinders 75 which is adjustable at a distance, for instance from pipe-bedding installation 3. The rollers 73 are provided with friction-increasing wear layers 67.

The installation of FIG. 24 has a trunk 10 corresponding with FIG. 17, wherein the buoyancy means of the trunk tubes 22 are replaced by air bags 47 received in steel cylinders 69 which are inflated via valves 71 to a determined pressure which is higher than the local water pressure at high level. When the pipe string 10 is fully lowered to the seabed in heavy weather a flange or the like is welded onto its upper end such that trunk 10 cannot slide off pipe string 5. The trunk 10 then moves therewith as far as the seabed, wherein the air bags 47 shrivel under the high water pressure without being damaged, as the pressure inside and outside air bags 47 is then equal.

In all the above mentioned embodiments of the trunks 10 each tube 14 can be provided with contact means fixedly clamping the pipe string 5. It is however also conceivable for only one tube 14 or only a small number of tubes 14 to be provided with clamping contact means. It is possible to distribute the clamping contact homogeneously over the length of trunk 10, for which purpose the applied pneumatic and/or hydraulic clamping pressure is then adapted to the local water depth, but it is also possible to clamp either to a larger degree or only the upper end or lower end of trunk 10 to the pipe string 5 so that trunk 10 is under strain of pressure respectively under strain of tension. Trunk 10 can also be attached to the pipe-bedding installation 3 or its stinger 4.

Instead of being provided with air cylinders 16 the trunk 10 can be provided with mechanical springs which provide normal power to create friction between trunk 10 and pipe string 5, while the trunk 10 is attached to pipe-bedding installation 3, for instance by means of cables.

In a variant the trunk 10 provided with buoyancy means has internal coupling elements which are remotely controllable for example from pipe-bedding installation 3 and which can be placed into and out of the path of rings fixed to the pipe string 5.

Used in another variant instead of air cylinders 16 adjusted to a determined pressure are pressure cylinders which are remotely operated pneumatically or hydraulically, for example from the pipe-bedding installation, and which supply the normal power required for a desired friction.

Figure 18:
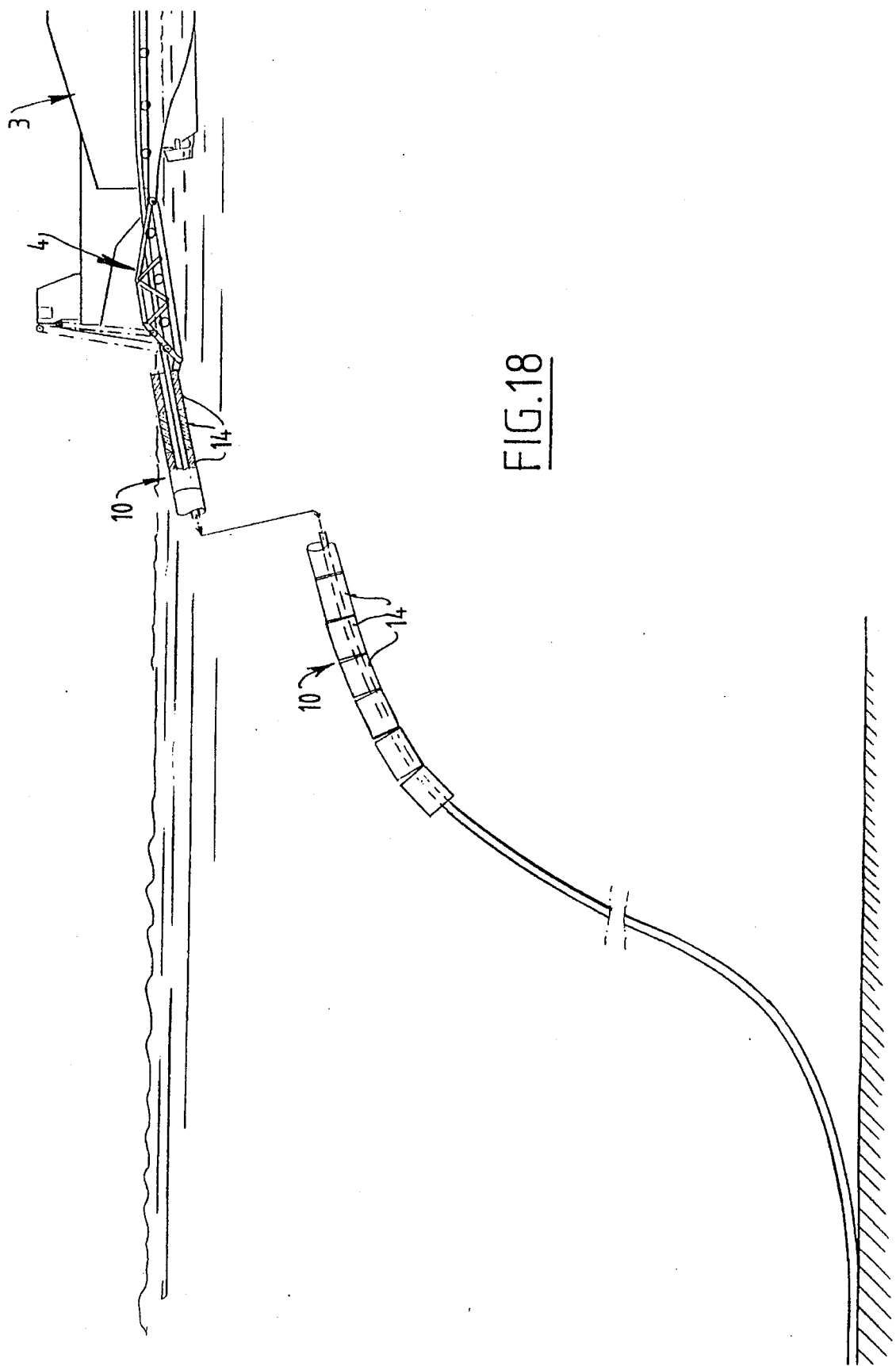

According to FIG. 18 a trunk 10 disposed in lying position is fixed to a short stinger 4 of pipe-bedding installation 3. The trunk tubes 14 which have buoyancy capacity support the pipe string without clamping means. Only the friction between trunk and pipe string reduces the tractive force of the draw benches disposed on board pipe-bedding installation 3.

The longer the trunk 10, the less the tensile stress in the pipe string becomes. The pipe string laid with less tensile stress then lies with less tension on the seabed and thereby adapts better to the seabed. This will decrease seabed correction operations.

The installations 1 of FIG. 27 and 38 differ from the installation 1 of FIG. 1 in that the trunk elements 78, 79 of FIG. 27 respectively 38 clamp fixedly on the pipe string 5 to a determined depth and then slide upward over the trunk elements 78, 79 fixedly clamped to pipe string 5 and are clamped once again to pipe string 5 at the top.

According to FIG. 28 the trunk elements 78 move downward with the downward moving pipe string 5 until the lowest trunk element 78a of FIG. 29 reaches the depth level 80 and then spreads itself such that as according to FIG. 30 it slides upward due to its buoyancy over the fixedly clamped trunk element 78 present thereabove.

Round the upper end of trunk 10, which according to FIG. 31 strikes against a stop flange 81, the spread trunk elements 78b slide against each other (FIG. 32). The uppermost trunk element 78c contracts when it is no longer prevented from contracting by a trunk element 78 present on the inside, then clamps onto pipe string 5 and then moves downward therewith. The string of spread trunk elements 78b then shifts one trunk element length upward.

Each trunk element 78 consists of a gear rim of floating bodies 83 of light material, for instance syntactic foam, which are mutually connected in peripheral direction by means of pairs of links 82, this for instance in accordance with the configuration of FIGS. 34–36. The links 82 are situated at a plurality of locations distributed over the trunk element length and are each hingedly connected on one side to floating bodies 83 at hinges 84 and mutually by means of hinges 85. The floating bodies 83 of trunk elements 78 are situated in their clamping position on pipe string 5 at a small gear rim inner diameter d which is equal to the outer diameter of pipe string 5, while in the spread situation the floating bodies 83 are situated at an inner diameter D which is equal to the outer diameter of the clamped together floating bodies 83. The drive means for clamping together floating bodies 83 consist in FIGS. 36 and 37 of a tension cable 86 which is attached to a pin 87 and which is guided over discs 88 incorporated in floating bodies 83 and connected to the piston 89 of a cylinder 90 received in lengthwise direction in a floating body 83. The one cylinder chamber 91 under the pressure of for instance 50 bar of an accumulator 92, for instance nitrogen cylinder, tightens the tension cable 86.

A control device 94 arranged in a pressure vessel 93 comprises a pressure sensor 95 which via an integrator 96 or a filter, and a comparator 97 opens a water valve 99 when a determined outside water pressure, for example 100 bar at 1000 m depth, is exceeded, which determined pressure is adjusted by a pressure adjuster 98, so that the water pressure displaces the piston 89 in cylinder 90 and the tension cable is slackened so that the floating bodies 83 are allowed to spread. This spreading is initiated in that the upper surfaces 100 and lower surfaces 101 of adjoining trunk elements 78a and 78 mutually engage and the released floating bodies 83 of the lowest trunk element 78a are thereby urged outward such that the lowest trunk element 78a shifts upward over the higher positioned trunk elements 78.

When a lower pressure, for instance 90 bar, is detected, the sensor 95 sends the relevant signal via integrator 96 to the comparator 97 which causes the valve 99 to close in the situation where the cylinder 90 is practically wholly filled with water and the accumulator is under considerable pressure. When the relevant trunk element 78b as uppermost trunk element 78c strikes with its spring-loaded switch 102 against the fixed flange 81 the voltage of a battery 104 is conducted via switch 102 to the valve 99 to open this valve 99. The accumulator then drives the water out of cylinder 90 and then tensions tension cable 86 so that the uppermost trunk element 78c clamps onto the pipe string 5 as soon as another trunk element 78 is no longer situated inside it.

The trunk elements 79 of FIGS. 38–40 consist of three floating bodies, that is, a middle piece 106 and two clamping jaws 107 which are placed in mutual hinged connection by means of longitudinal hinges 108 to form a gear rim clamped round pipe string 5. The clamping jaws are fixedly clamped to pipe string 5 by means of a plurality of cylinders 109 distributed over their length which are energized as in the case of cylinder 90 from an accumulator 92 with associated circuit 94. In the opened position the clamping jaws 107 of trunk elements 79b grip under guide ridges 110 of trunk elements 79 still clamping onto pipe string 5. Accumulator 92 and pressure vessel 93 are accommodated in the middle piece 106. In order to catch the upper ends of clamping jaws 107 of a spreading lower trunk element 79a under guide ridges 110 the clamping jaws have upward protruding teeth 111 which fit in the clamping position into corresponding recesses 112 on the bottom end of each trunk element 79. In order to catch the lower end of trunk element 79a there are two alternatives. According to FIGS. 41–43 a cylindrical floating body 113 slides on the pipe string 5 under the trunk 10, the bottom end of which body also slides with considerable clearance over thickenings of pipe string 5. The lower end of the spreading trunk element 78a remains caught in cylinder 113.

According to the alternative of FIGS. 44–47 each trunk element 79 has a separated bottom end 116 which is designed in substantially the same manner as the described trunk element 79 with teeth 111 and recesses 112 and with a cylinder 109 and associated accumulator 92 with circuit 94, although it is not now controlled by a water pressure-sensitive sensor 95 but by a pressure switch 120 which is actuated by a lower end 121 of a still clamped trunk element 79 striking against it.

The clamping jaws are formed such that they do not clamp onto the pipe string 5 but they connect with their surfaces 122 against the middle piece 106. Cables 123 hold the lower end 116 fixed to the upper piece 124.

FIG. 49 shows terminals 190 and 191, of which terminal 190 is located for example in Oman and terminal 191 in India. Terminal 190 contains at least one pump 193 which receives gas supplied via a pipe 194. A pipe 195 is connected on one side to the outlet of pump 193 and on the other side to a pipe string 196 which is laid with use of the method according to the invention.

A pipe 196 is likewise connected to a pump 192 which is situated in a terminal 191 and which is connected at the other side to pipe string 196. As a result of the invention the terminals 190 and 191 can function to transport gas via deep sea 197 with a depth of more than 1 km to another country separated by the deep sea gap.

We claim:

1. Apparatus for laying a pipeline on a floor located under water comprising a pipe bedding installation with securing means for supporting a pipe string extending between the pipe bedding installation and the floor while said pipe string is lowered into the water, characterized by bearing means which at least partially supports the part of said pipe string situated between the water surface and the floor, said bearing means having at least one trunk tube, said trunk tube provided with a plurality of energizing cylinders which engage said trunk tube on said pipe string by means of a train of rollers when said energizing cylinders are energized, and disengage said trunk tube and said pipe string when not energized thereby allowing relative movement between said pipe string and said trunk tube.

2. The apparatus of claim 1 in which said train of rollers is deformable.

3. The apparatus of claim 1 which includes buoyancy means mounted in the water having a buoyant capacity, said buoyancy means connected to said bearing means thereby partially supporting said bearing means and said pipe string.

4. The apparatus of claim 3 wherein said buoyancy means includes a plurality of air cylinders.

5. The apparatus as claimed in claim 1 wherein said train of rollers includes braking means for maintaining said train of rollers in contact with said pipe string.

6. The apparatus of claim 1 wherein at least one of said trunk tubes comprises at least two brass pans which are mutually complete substantially in the peripheral direction of said pipe string.

7. The apparatus of claim 1 wherein said bearing means has at least two successive trunk tubes mutually coupled by means of complementary coupling means.

8. The apparatus of claim 1 wherein said bearing means includes at least one trunk tube which consists of a composite material of plastic with hollow glass beads.

9. The apparatus of claim 6 wherein said brass parts are mutually coupled by means of at least one axially oriented hinge.

* * * * *